US009022864B2

(12) United States Patent
Westlund et al.

(10) Patent No.: US 9,022,864 B2
(45) Date of Patent: *May 5, 2015

(54) APPARATUS AND METHOD FOR CONTROLLING OBJECTS ON A STEREOSCOPIC DISPLAY

(75) Inventors: Harold B. Westlund, Port Coquitlam (CA); Yoshihito Ikebata, Kyoto (JP); Ryuichi Nakada, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 257 days.

This patent is subject to a terminal disclaimer.

(21) Appl. No.: 13/362,657

(22) Filed: Jan. 31, 2012

(65) Prior Publication Data

US 2012/0309522 A1 Dec. 6, 2012

Related U.S. Application Data

(63) Continuation-in-part of application No. 13/152,931, filed on Jun. 3, 2011, now Pat. No. 8,376,849.

(51) Int. Cl.
*A63F 9/24* (2006.01)
*A63F 13/00* (2014.01)
*G06F 17/00* (2006.01)
*G06F 19/00* (2011.01)
*A63F 13/40* (2014.01)
*H04N 13/00* (2006.01)
*H04N 13/04* (2006.01)

(52) U.S. Cl.
CPC ......... *A63F 13/10* (2013.01); *A63F 2300/6653* (2013.01); *H04N 13/0022* (2013.01); *H04N 13/0018* (2013.01); *H04N 13/0409* (2013.01); *H04N 13/0452* (2013.01); *A63F 2300/6615* (2013.01)

(58) Field of Classification Search
USPC ........................................................... 463/33
See application file for complete search history.

(56) References Cited

U.S. PATENT DOCUMENTS

| 7,046,242 B2 | 5/2006 | Kitsutaka |
| 7,371,163 B1 | 5/2008 | Best |
| 2005/0219239 A1 | 10/2005 | Mashitani et al. |
| 2006/0046844 A1 | 3/2006 | Kaneko |

FOREIGN PATENT DOCUMENTS

| EP | 0 751 689 A2 | 1/1997 |
| JP | 2004007396 | 1/2004 |

OTHER PUBLICATIONS

Dec. 4, 2013 Search Report for EP 11182652.5, 6 pages.
Office Action in parent case U.S. Appl. No. 13/152,931 (now U.S. Patent No. 8,376,849) dated Jul. 3, 2012.
Notice of Allowance in U.S. Appl. No. 13/152,931 dated Nov. 21, 2012.
European Search Report in Application No. EP 12 17 0667 dated Oct. 1, 2013.
European Search Report in Application No. EP 12 17 0668 dated Oct. 1, 2013.
Office Action in U.S. Appl. No. 13/242,113 dated Nov. 13, 2014.

*Primary Examiner* — Kevin Y Kim
(74) *Attorney, Agent, or Firm* — Nixon & Vanderhye, P.C.

(57) ABSTRACT

A game environment is presented where the 3-D object is properly transitioned from the player's field of view. For example, the perceived position of the 3-D object in the real 3-D space is measured, and if the distance from the display exceeds a threshold, the system will gradually transition the object out of the player's field of view. As another example, the distance of the object from a virtual camera can be measured in a virtual space and if the distance comes within a threshold value, the system will fade the object from the display. As a further example, the distance of the object from a predefined reference plane in the virtual space can be measured to determine the object's perceived visual distance in the real 3-D space and if the object exceeds a predetermined threshold value, the object will begin fading from the display.

20 Claims, 17 Drawing Sheets

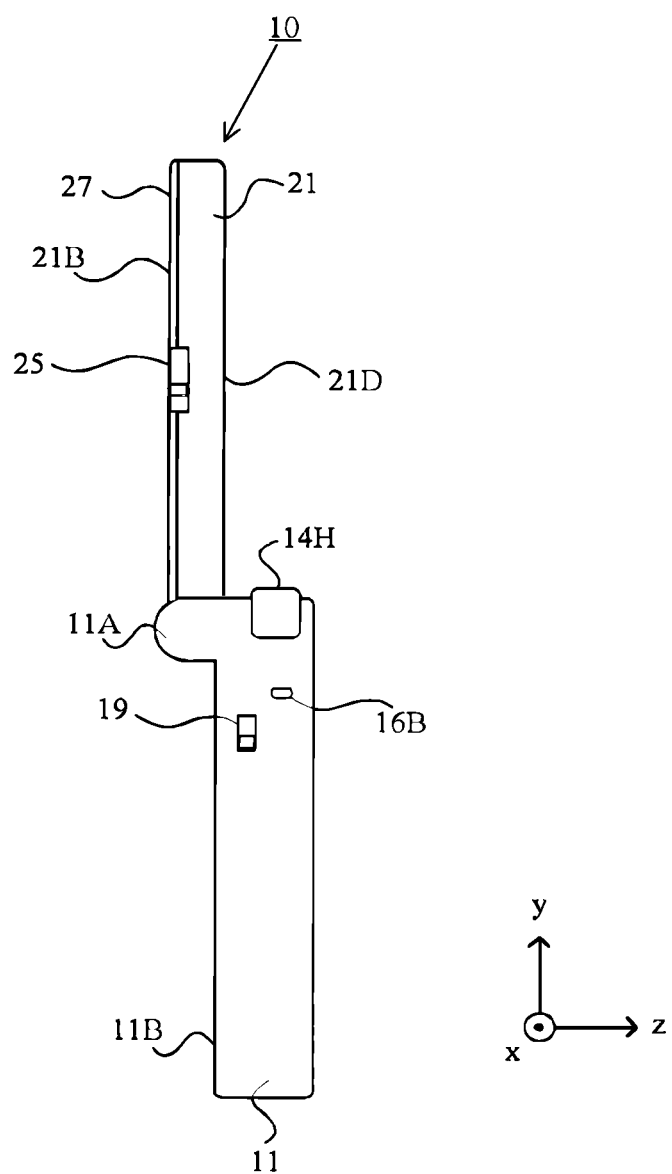

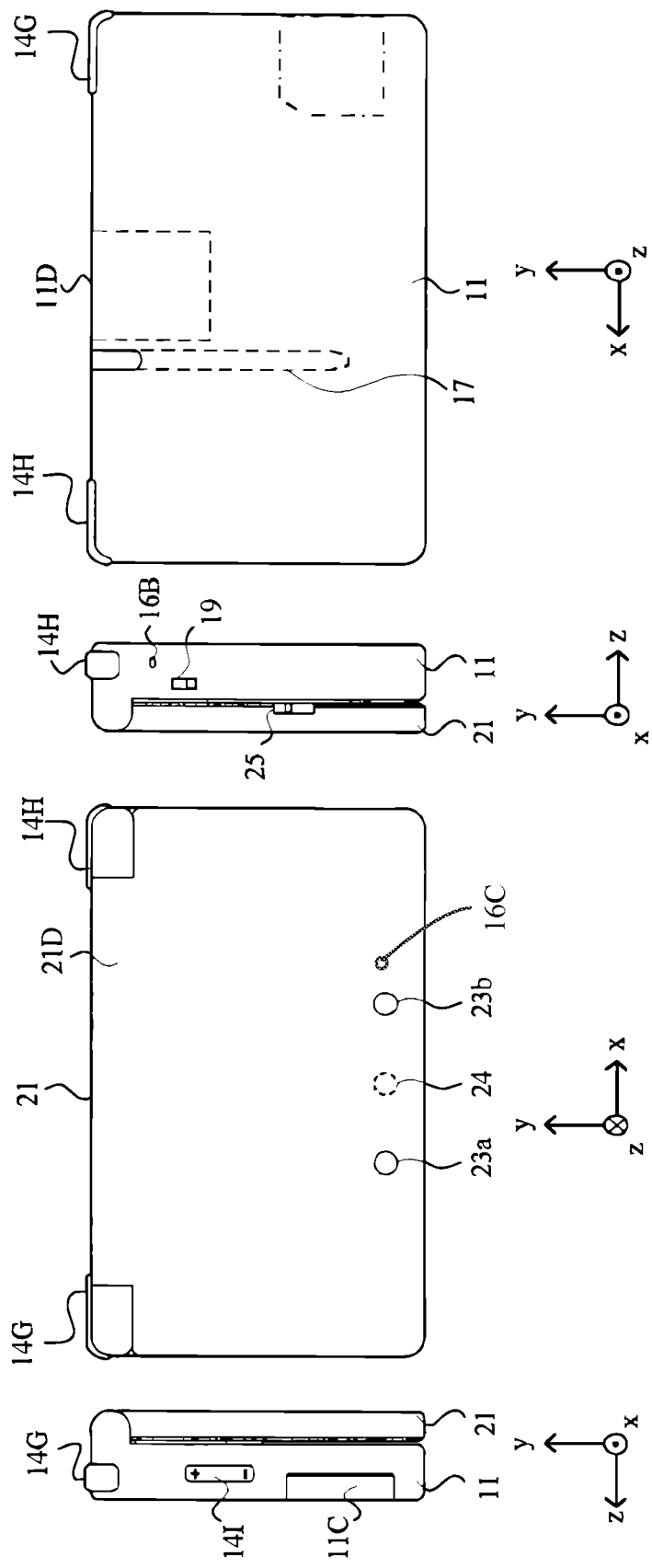

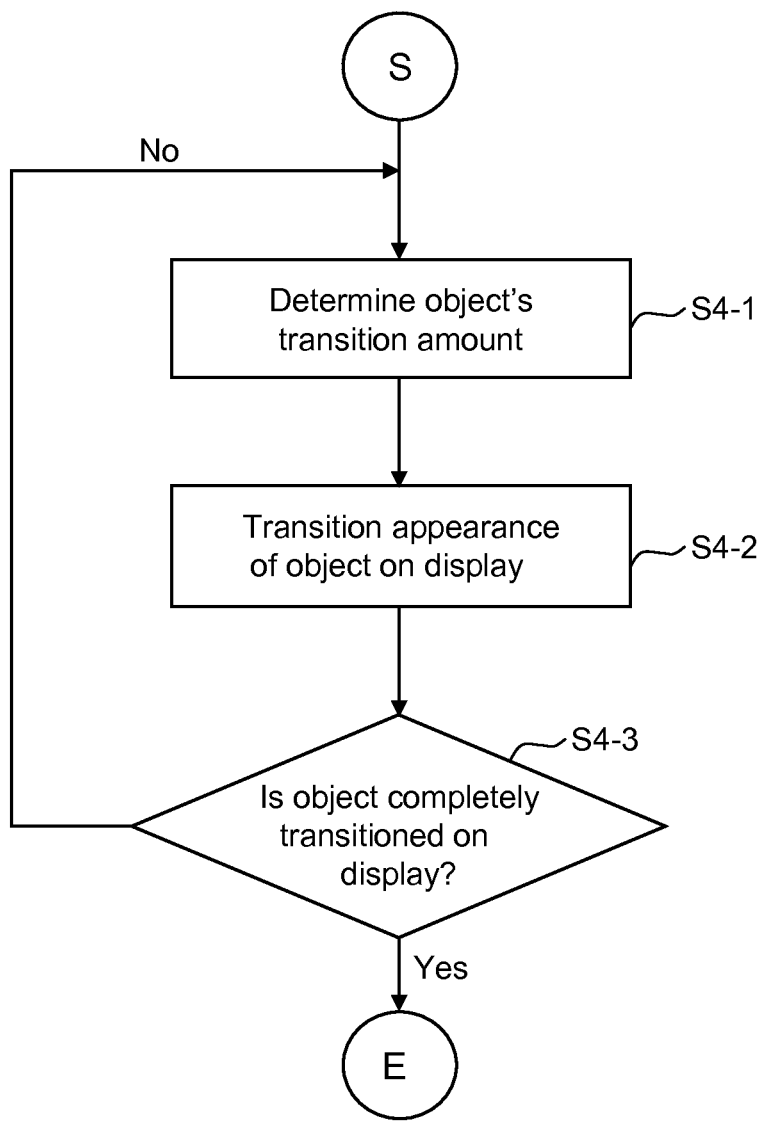

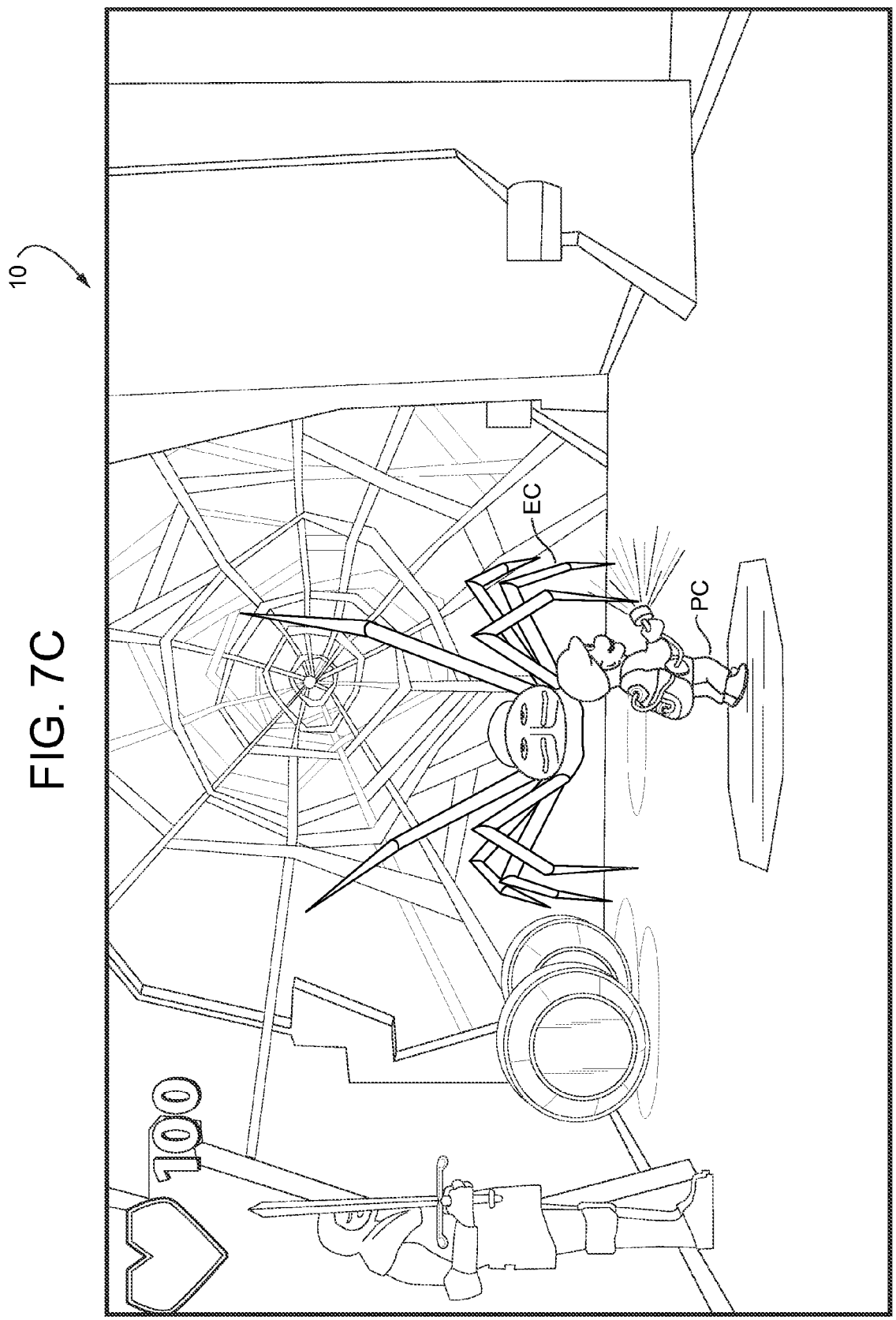

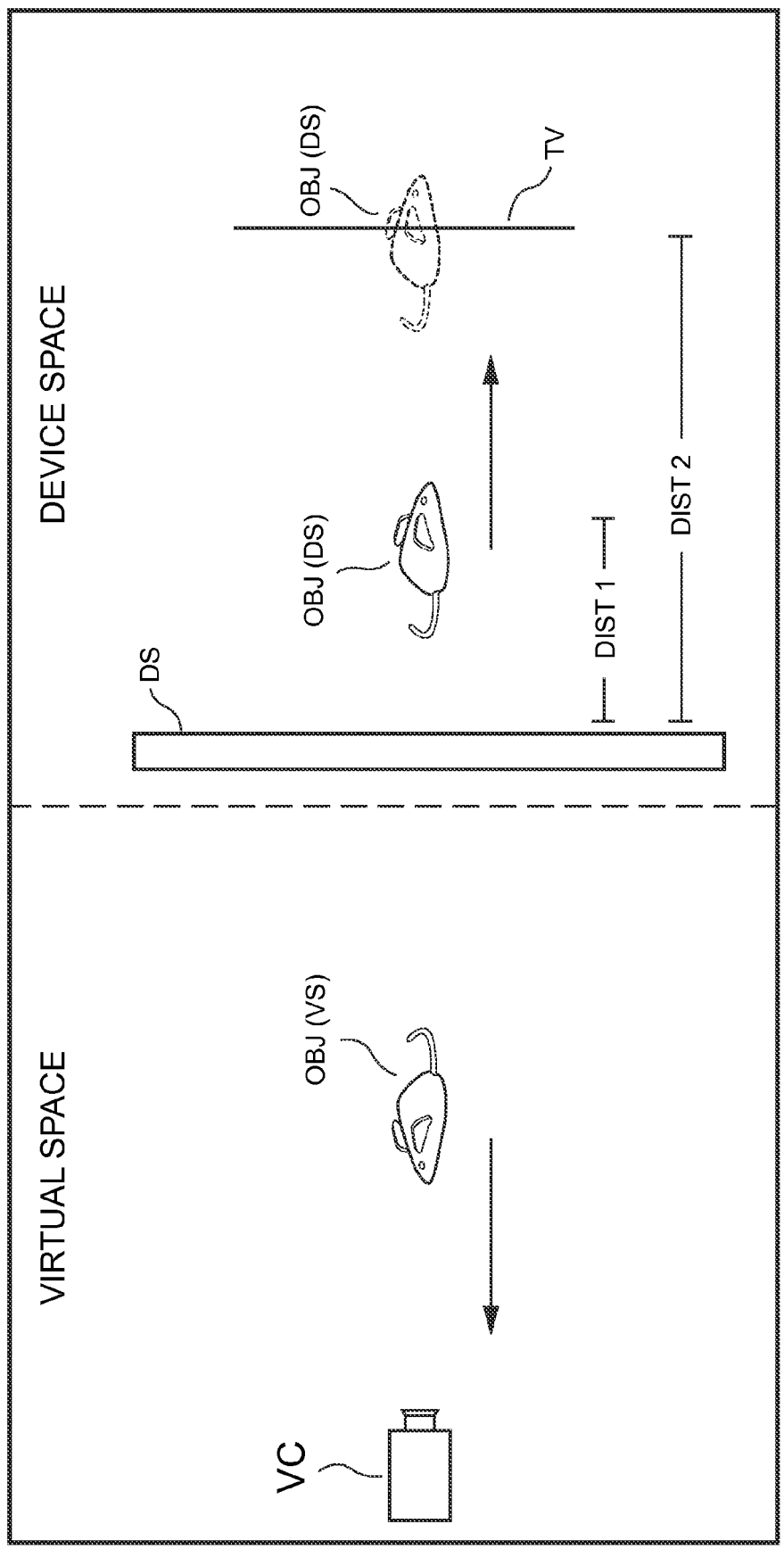

APPARATUS AND METHOD FOR
CONTROLLING OBJECTS ON A
STEREOSCOPIC DISPLAY

CROSS REFERENCE OF RELATED
APPLICATION

This application is a continuation-in-part of U.S. patent application Ser. No. 13/152,931, filed Jun. 3, 2011, the entire contents of which is herein incorporated by reference.

BACKGROUND

Video game environments have evolved greatly over the last several decades. Video games were traditionally played in a 2-D game environment where a player could operate player characters in an X-Y coordinate space. For example, in the classic 80's game Super Mario Bros., the player could move the player character Mario in an X-Y coordinate space by making him move left or right using a controller, or jump up and down using a button.

Video games eventually evolved into more robust 3-D environments. In a 3-D environment a player character could be moved in the X-Y-Z coordinate space. For example, a "first-person-shooter" game would allow a player to view through a virtual camera in the "eyes" of the player character. By moving a controller left or right, the player character would consequently move in a positive x-direction or a negative x-direction in the X-Y-Z coordinate space. Likewise, moving the controller up or down would result in the player character moving in the positive or negative z-direction. Pushing a button could then result in the player character "jumping" up and down in the y-direction.

Gaming environments that implemented 3-D gaming environments, or virtual 3-D worlds were limited by the 2-D displays of standard computer monitors or television sets. As such, video games performed 3-D rendering of the 3-D coordinate space so that the 2-D display could show a "3-D" world. This gave the player the appearance as though they were moving around in a 3-D environment despite being limited by the display's 2-D image generation.

Now, with the advent of 3-D televisions and 3-D displays, a gaming environment's 3-D coordinate space can be displayed in the real 3-D visual display. Objects can therefore move away from and towards the screen as though they are moving along a "z-axis" of view, for example.

However, much like watching a 3-D movie, objects that move too far from the display screen can distract the viewer or appear unnatural when viewing the object. For example, a viewer may have a difficult time focusing on other visual objects as an object moves too close to the viewer.

Gaming systems have partially addressed this issue by preventing the virtual camera from moving to a position where the object would distract the viewer or appear unnatural. However, this is not advantageous because it constrains the virtual camera in ways which can detract from gameplay.

Other gaming systems have provided clipping planes that essentially "clip" the visual object. This method is also not advantageous because it slices off part of the object closest to the viewer, giving the object an appearance as though it is coming apart as it leaves the screen. It is therefore desirable to provide a system that properly transitions an object as it is coming out towards the viewer.

BRIEF SUMMARY

In order to address this issue, a game environment is presented where the 3-D object is properly transitioned from the player's field of view. For example, the perceived position of the 3-D object in the real 3-D space is measured, and if the distance from the display exceeds a threshold, the system will perform a linear blending on the object to gradually transition the object out of the player's field of view. As another example, the distance of the object from a virtual camera can be measured in a virtual space and if the distance comes within a threshold value, the system will fade the object from the display. As a further example, the distance of the object from a predefined reference plane in the virtual space can be measured to determine the object's perceived visual distance in the real 3-D space and if the object exceeds a predetermined threshold value, the object will begin fading from the display. This allows the object to smoothly transition from the screen before the object distracts the player or appears unnatural, while at the same time leaving the visual appearance of the object intact and allowing the virtual camera to move freely, without limitations.

A method of managing objects on a stereoscopic display is provided. The location of an object on a stereoscopic display is determined and the visual distance of the object from the stereoscopic display is determined. If the visual distance of the object exceeds a threshold value, the appearance of the object will be transitioned on the stereoscopic display.

A non-transitory computer-readable storage medium is disclosed having computer readable code embodied therein is provided for executing the managing objects on a stereoscopic display method described in the preceding paragraph.

Another aspect relates to a gaming apparatus having a stereoscopic display, a memory configured to store a program for managing the objects on the stereoscopic display, and a processor configured for managing the objects on the stereoscopic display. The processor is further configured to determine a location of the object on the stereoscopic display and determine its visual distance from the stereoscopic display. If the visual distance of the object exceeds a threshold value, the appearance of the object will transition on the display.

Another aspect relates to a method and system which performs determining, using a computer processor, a position of a virtual object; based on the position of the virtual object, determining a perceived distance of an image of the virtual object in front of an image of a three-dimensional world; determining if the perceived distance reaches a limit; and gradually deleting an appearance of the image of the object if the perceived distance reaches the determined limit. The limit may have a first value if the virtual object is a first type of object, and the limit may have a different value if the virtual object is a different type of object than the first type of object. The limit may have a first value if the virtual object is positioned at or near a center of the image, and the limit may have a different value if the virtual object is positioned at or near a periphery of the image.

Another aspect relates to a method of managing objects on a display, comprising determining a location of an object in a virtual space, determining a distance of the object from a virtual camera in the virtual space, determining if the distance of the object from the virtual camera comes within a threshold value, and transitioning an appearance of the object on the display if the distance comes within the threshold value.

Another aspect relates to a method of managing objects on a display, comprising determining a location of an object in a virtual space, determining a distance of the object from a reference plane in the virtual space, determining if the distance of the object from the reference plane exceeds a threshold value, and transitioning an appearance of the object on the display if the distance exceeds the threshold value.

A non-transitory computer-readable storage medium is disclosed having computer readable code embodied therein is provided for executing the managing objects on a stereoscopic display method described in the preceding paragraphs.

Yet another aspect relates to a user interface apparatus comprising a display for displaying objects, a memory configured to store a program for managing the objects on the display, and one or more processors configured for managing the objects on the display. The one or more processors are configured to determine a location of an object in a virtual space, determine a distance of the object from a virtual camera in the virtual space, determine if the distance of the object from the virtual camera comes within a threshold value, and transition an appearance of the object on the display if the distance comes within the threshold value.

Another aspect relates to a user interface apparatus comprising a display for displaying objects, a memory configured to store a program for managing the objects on the display, and one or more processors configured for managing the objects on the display. The one or more processors are configured to determine a location of an object in a virtual space, determine a distance of the object from a reference plane in the virtual space, determine if the distance of the object from the reference plane exceeds a threshold value, and transition an appearance of the object on the display if the distance exceeds the threshold value.

Yet another aspect relates to a user interface system comprising a display device for display objects and a user interface apparatus. The user interface apparatus has a memory configured to store a program for managing the objects on the display device, and one or more processors configured for managing the objects on the display device. The one or more processors are configured to determine a location of an object in a virtual space, determine a distance of the object from a virtual camera in the virtual space, determine if the distance of the object from the virtual camera comes within a threshold value, and transition an appearance of the object on the display device if the distance comes within the threshold value.

Another aspect relates to a user interface system comprising a display device for display objects and a user interface apparatus. The user interface apparatus has a memory configured to store a program for managing the objects on the display device, and one or more processors configured for managing the objects on the display device. The one or more processors are configure to determine a location of an object in a virtual space, determine a distance of the object from a reference plane in the virtual space, determine if the distance of the object from the reference plane exceeds a threshold value, and transition an appearance of the object on the display device if the distance exceeds the threshold value.

In a non-limiting, example implementation, the appearance of the object will transition gradually over a pre-set period of time. The transitioning of the appearance of the object, for example, can fade using a blending technique.

In yet another implementation, the location of the object is in a three-dimensional device space and the measurement of the visual distance of the object is a distance in the three-dimensional device space. The location of the object in the three-dimensional device space can be determined, for example, based on a conversion of a location of the object in a virtual three-dimensional space. The device space represents how a real three-dimensional space would be perceived.

In another non-limiting, example implementation, the threshold value can be variable depending upon a type of the object. The threshold value can also be variable, for example, depending upon a state of gameplay involving the object.

In yet another non-limiting, example implementation the closer the object comes to the virtual camera the closer the object comes within the threshold value.

In another non-limiting, example implementation the reference plane in the virtual space corresponds to a reference plane in a real device space and the appearance of the object transitions based upon a perceived visual distance of the object in the real device space using the measured distance of the object from the reference plane in the virtual space.

BRIEF DESCRIPTION OF THE DRAWINGS

FIG. 2 is a side view showing an example of the game apparatus 10 in the open state;

FIG. 3A is a left side view showing an example of the game apparatus 10 in a closed state;

FIG. 3B is a front view showing an example of the game apparatus 10 in the closed state;

FIG. 3C is a right side view showing an example of the game apparatus 10 in the closed state;

FIG. 3D is a rear view showing an example of the game apparatus 10 in the closed state;

FIGS. 5A-C are exemplary application flowcharts depicting application processes for the present system;

FIGS. 7A-C are examples showing an example implementation of the present system; and FIGS. 8A-C are example diagrams showing certain example embodiments of the present system.

DETAILED DESCRIPTION OF THE DRAWINGS

Figure 1:
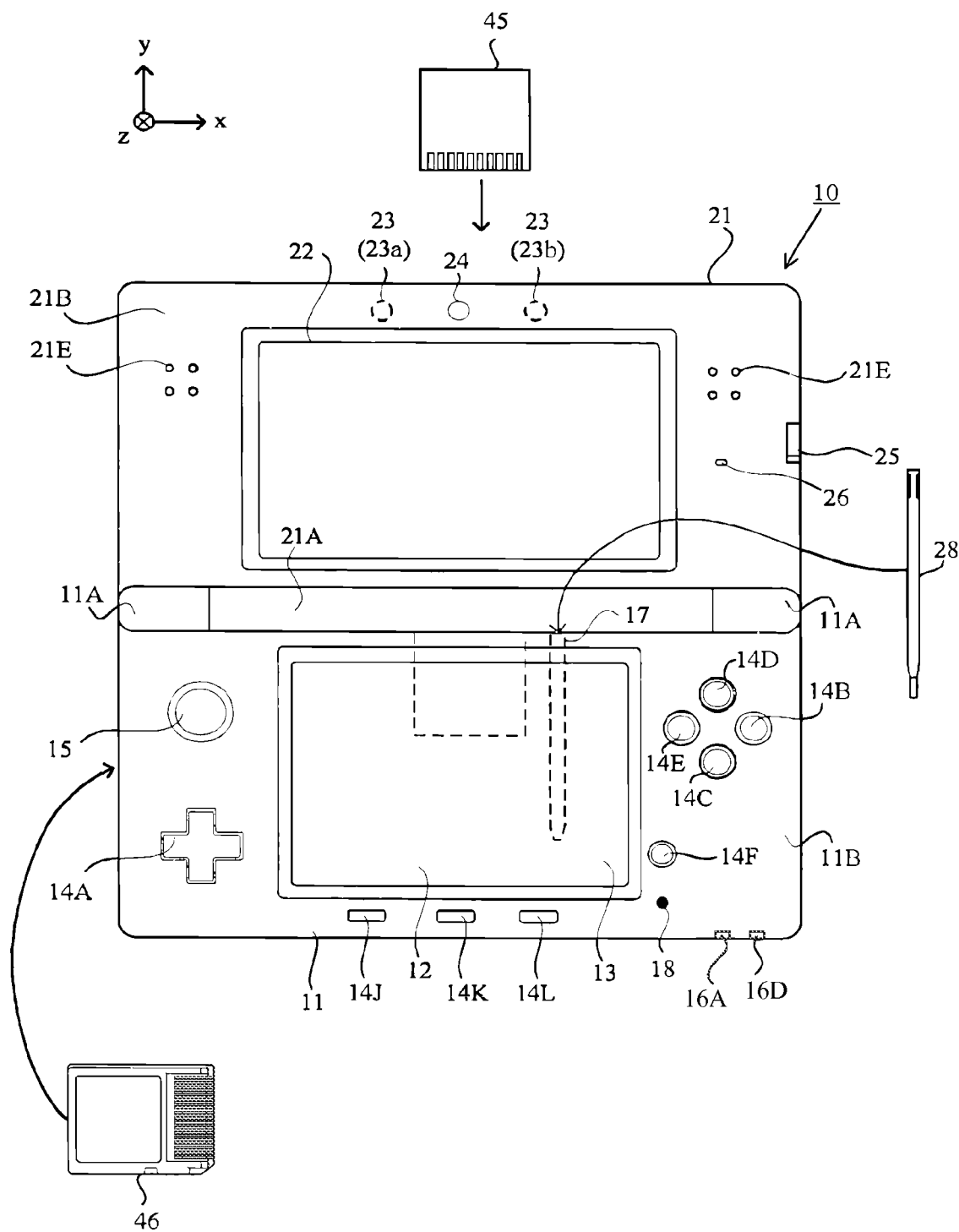
FIG. 1 is a front view showing an example of a game apparatus 10 in an open state.

A description is given of a specific example of an image processing apparatus that executes an image processing program according to an embodiment of the present system. The following embodiment, however, is merely illustrative, and the present system is not limited to the configuration of the following embodiment.

It should be noted that in the following embodiment, data processed by a computer is illustrated using graphs and natural language. More specifically, however, the data is specified by computer-recognizable pseudo-language, commands, parameters, machine language, arrays, and the like. The present embodiment does not limit the method of representing the data.

First, with reference to the drawings, a description is given of a hand-held game apparatus 10 as an example of the image processing apparatus that executes the image processing program according to the present embodiment. The image processing apparatus according to the present system, however, is not limited to a game apparatus. The image processing apparatus according to the present system may be a given computer system, such as a general-purpose computer. The image processing apparatus may also not be limited to a portable electronic gaming device and may be implemented on a home entertainment gaming device, such as the Nintendo Wii, for example. A description of an example home entertainment gaming device can be found in U.S. application Ser. No. 12/222,873 (U.S. Patent Publication No. 2009/0181736) which is hereby incorporated by reference. The home entertainment gaming device can be played, for example, on a standard television, on a 3-D television, or even on a holographic television.

It should be noted that the image processing program according to the present embodiment is a game program. The image processing program according to the present system, however, is not limited to a game program. The image processing program according to the present system can be applied by being executed by a given computer system. Further, the processes of the present embodiment may be subjected to distributed processing by a plurality of networked devices, or may be performed by a network system where, after main processes are performed by a server, the process results are distributed to terminals, or may be performed by a so-called cloud network.

FIGS. 1, 2, 3A, 3B, 3C, and 3D are each a plan view showing an example of the appearance of the game apparatus 10. The game apparatus 10 shown in FIGS. 1 through 3D includes a capturing section (camera), and therefore is capable of capturing an image with the capturing section, displaying the captured image on a screen, and storing data of the captured image. Further, the game apparatus 10 is capable of executing a game program stored in an exchangeable memory card, or a game program received from a server or another game apparatus via a network. The game apparatus 10 is also capable of displaying on the screen an image generated by computer graphics processing, such as an image captured by a virtual camera set in a virtual space. It should be noted that in the present specification, the act of obtaining image data with the camera is described as "capturing", and the act of storing the image data of the captured image is described as "photographing".

Figures 1, 5A:
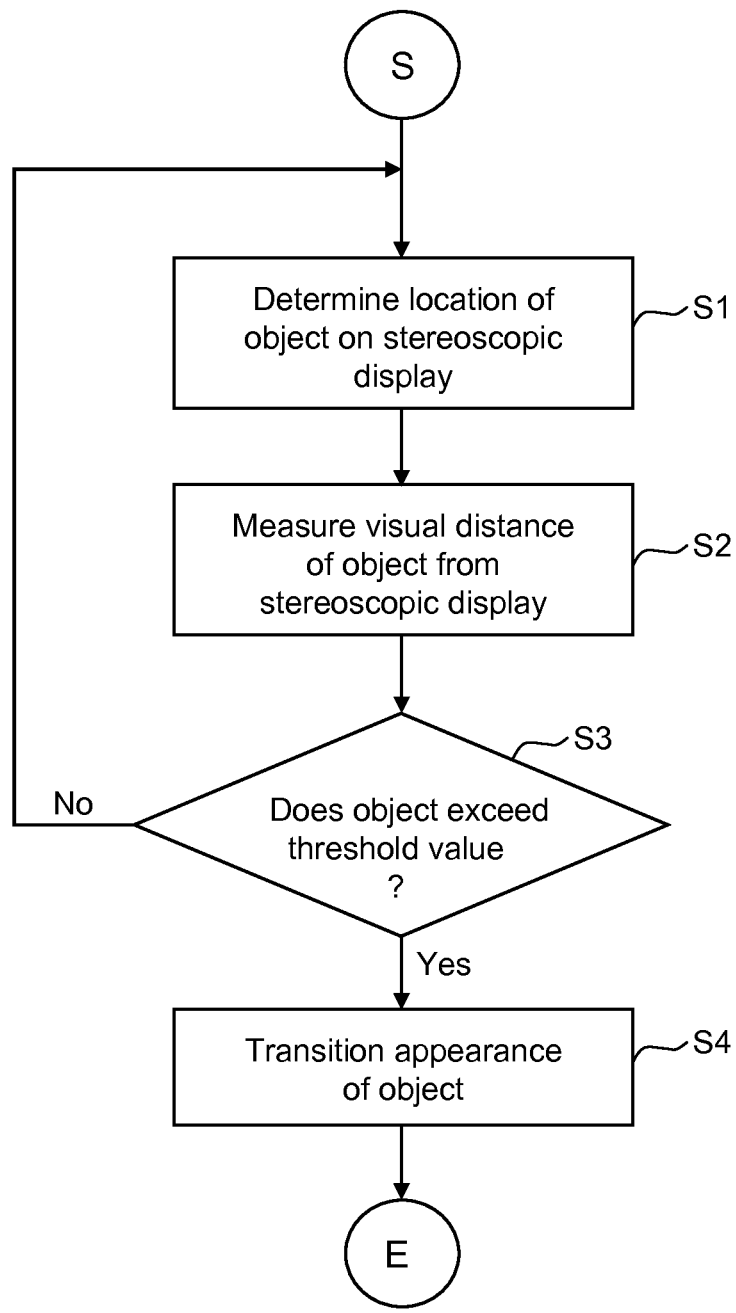
Figures 2, 5A:
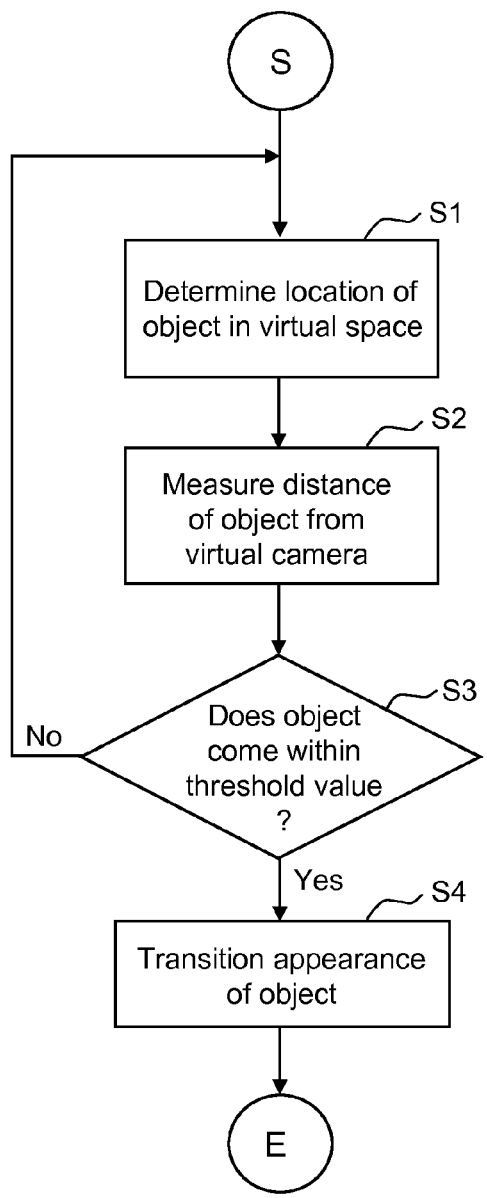

The game apparatus 10 shown in FIGS. 1 through 3D includes a lower housing 11 and an upper housing 21. The lower housing 11 and the upper housing 21 are joined together by a hinge structure so as to be openable and closable in a folding manner (foldable). That is, the upper housing 21 is attached to the lower housing 11 so as to be rotatable (pivotable) relative to the lower housing 11. Thus, the game apparatus 10 has the following two forms: a closed state where the upper housing 21 is in firm contact with the lower housing 11, as seen for example in FIGS. 3A and 3C; and a state where the upper housing 21 has rotated relative to the lower housing 11 such that the state of firm contact is released (an open state). The rotation of the upper housing 21 is allowed to the position where, as shown in FIG. 2, the upper housing 21 and the lower housing 11 are approximately parallel to each other in the open state (see FIG. 2).

FIG. 1 is a front view showing an example of the game apparatus 10 being open (in the open state). A planar shape of each of the lower housing 11 and the upper housing 21 is a wider-than-high rectangular plate-like shape having a longitudinal direction (horizontal direction (left-right direction): an x-direction in FIG. 1) and a transverse direction ((up-down direction): a y-direction in FIG. 1). The lower housing 11 and the upper housing 21 are joined together at the longitudinal upper outer edge of the lower housing 11 and the longitudinal lower outer edge of the upper housing 21 by a hinge structure so as to be rotatable relative to each other. Normally, a user uses the game apparatus 10 in the open state. The user stores away the game apparatus 10 in the closed state. Further, the upper housing 21 can maintain the state of being stationary at a desired angle formed between the lower housing 11 and the upper housing 21 due, for example, to a frictional force generated at the connecting part between the lower housing 11 and the upper housing 21. That is, the game apparatus 10 can maintain the upper housing 21 stationary at a desired angle with respect to the lower housing 11. Generally, in view of the visibility of a screen provided in the upper housing 21, the upper housing 21 is open at a right angle or an obtuse angle with the lower housing 11. Hereinafter, in the closed state of the game apparatus 10, the respective opposing surfaces of the upper housing 21 and the lower housing 11 are referred to as "inner surfaces" or "main surfaces." Further, the surfaces opposite to the respective inner surfaces (main surfaces) of the upper housing 21 and the lower housing 11 are referred to as "outer surfaces".

Projections 11A are provided at the upper long side portion of the lower housing 11, each projection 11A projecting perpendicularly (in a z-direction in FIG. 1) to an inner surface (main surface) 11B of the lower housing 11. A projection (bearing) 21A is provided at the lower long side portion of the upper housing 21, the projection 21A projecting perpendicularly to the lower side surface of the upper housing 21 from the lower side surface of the upper housing 21. Within the projections 11A and 21A, for example, a rotating shaft (not shown) is accommodated so as to extend in the x-direction from one of the projections 11A through the projection 21A to the other projection 11A. The upper housing 21 is freely rotatable about the rotating shaft, relative to the lower housing 11. Thus, the lower housing 11 and the upper housing 21 are connected together in a foldable manner.

The inner surface 11B of the lower housing 11 shown in FIG. 1 includes a lower liquid crystal display (LCD) 12, a touch panel 13, operation buttons 14A through 14L, an analog stick 15, a first LED 16A, a fourth LED 16D, and a microphone hole 18.

The lower LCD 12 is accommodated in the lower housing 11. A planar shape of the lower LCD 12 is a wider-than-high rectangle, and is placed such that the long side direction of the lower LCD 12 coincides with the longitudinal direction of the lower housing 11 (the x-direction in FIG. 1). The lower LCD 12 is provided in the center of the inner surface (main surface) of the lower housing 11. The screen of the lower LCD 12 is exposed through an opening of the inner surface of the lower housing 11. The game apparatus 10 is in the closed state when not used, so that the screen of the lower LCD 12 is prevented from being soiled or damaged. As an example, the number of pixels of the lower LCD 12 is 320 dots×240 dots (horizontal× vertical). Unlike an upper LCD 22 described later, the lower LCD 12 is a display device that displays an image in a planar manner (not in a stereoscopically visible manner). It should be noted that although an LCD is used as a display device in the first embodiment, any other display device may be used, such as a display device using electroluminescence (EL). Further, a display device having a desired resolution may be used as the lower LCD 12.

The touch panel 13 is one of input devices of the game apparatus 10. The touch panel 13 is mounted so as to cover the screen of the lower LCD 12. In the first embodiment, the touch panel 13 may be, but is not limited to, a resistive touch panel. The touch panel may also be a touch panel of any pressure type, such as an electrostatic capacitance type. In the first embodiment, the touch panel 13 has the same resolution (detection accuracy) as that of the lower LCD 12. The resolutions of the touch panel 13 and the lower LCD 12, however, may not necessarily need to be the same.

The operation buttons 14A through 14L are each an input device for providing a predetermined input. Among the operation buttons 14A through 14L, the cross button 14A (direction input button 14A), the button 14B, the button 14C, the button 14D, the button 14E, the power button 14F, the select button 14J, the home button 14K, and the start button 14L are provided on the inner surface (main surface) of the lower housing 11.

The cross button 14A is cross-shaped, and includes buttons for indicating at least up, down, left, and right directions, respectively. The cross button 14A is provided in a lower area of the area to the left of the lower LCD 12. The cross button 14A is placed so as to be operated by the thumb of a left hand holding the lower housing 11.

The button 14B, the button 14C, the button 14D, and the button 14E are placed in a cross formation in an upper portion of the area to the right of the lower LCD 12. The button 14B, the button 14C, the button 14D, and the button 14E, are placed where the thumb of a right hand holding the lower housing 11 is naturally placed. The power button 14F is placed in a lower portion of the area to the right of the lower LCD 12.

The select button 14J, the home button 14K, and the start button 14L are provided in a lower area of the lower LCD 12. The buttons 14A through 14E, the select button 14J, the home button 14K, and the start button 14L are appropriately assigned functions, respectively, in accordance with the program executed by the game apparatus 10. The cross button 14A is used for, for example, a selection operation and a moving operation of a character during a game. The operation buttons 14B through 14E are used, for example, for a determination operation or a cancellation operation. The power button 14F can be used to power on/off the game apparatus 10. In another embodiment, the power button 14F can be used to indicate to the game apparatus 10 that it should enter a "sleep mode" for power saving purposes.

The analog stick 15 is a device for indicating a direction. The analog stick 15 is provided to an upper portion of the area to the left of the lower LCD 12 of the inner surface (main surface) of the lower housing 11. That is, the analog stick 15 is provided above the cross button 14A. The analog stick 15 is placed so as to be operated by the thumb of a left hand holding the lower housing 11. The provision of the analog stick 15 in the upper area places the analog stick 15 at the position where the thumb of the left hand of the user holding the lower housing 11 is naturally placed. The cross button 14A is placed at the position where the thumb of the left hand holding the lower housing 11 is moved slightly downward. This enables the user to operate the analog stick 15 and the cross button 14A by moving up and down the thumb of the left hand holding the lower housing 11. The key top of the analog stick 15 is configured to slide parallel to the inner surface of the lower housing 11. The analog stick 15 functions in accordance with the program executed by the game apparatus 10. When, for example, the game apparatus 10 executes a game where a predetermined object appears in a three-dimensional virtual space, the analog stick 15 functions as an input device for moving the predetermined object in the three-dimensional virtual space. In this case, the predetermined object is moved in the direction in which the key top of the analog stick 15 has slid. It should be noted that the analog stick 15 may be a component capable of providing an analog input by being tilted by a predetermined amount in any one of up, down, right, left, and diagonal directions.

It should be noted that the four buttons, namely the button 14B, the button 14C, the button 14D, and the button 14E, and the analog stick 15 are placed symmetrically to each other with respect to the lower LCD 12. This also enables, for example, a left-handed person to provide a direction indication input using these four buttons, namely the button 14B, the button 14C, the button 14D, and the button 14E, depending on the game program.

The first LED 16A (FIG. 1) notifies the user of the on/off state of the power supply of the game apparatus 10. The first LED 16A is provided on the right of an end portion shared by the inner surface (main surface) of the lower housing 11 and the lower side surface of the lower housing 11. This enables the user to view whether or not the first LED 16A is lit on, regardless of the open/closed state of the game apparatus 10. The fourth LED 16D (FIG. 1) notifies the user that the game apparatus 10 is recharging and is located near the first LED 16A.

The microphone hole 18 is a hole for a microphone built into the game apparatus 10 as a sound input device. The built-in microphone detects a sound from outside the game apparatus 10 through the microphone hole 18. The microphone and the microphone hole 18 are provided below the power button 14F on the inner surface (main surface) of the lower housing 11.

The upper side surface of the lower housing 11 includes an opening 17 (a dashed line shown in FIGS. 1 and 3D) for a stylus 28. The opening 17 can accommodate the stylus 28 that is used to perform an operation on the touch panel 13. It should be noted that, normally, an input is provided to the touch panel 13 using the stylus 28. The touch panel 13, however, can be operated not only by the stylus 28 but also by a finger of the user.

The upper side surface of the lower housing 11 includes an insertion slot 11D (a dashed line shown in FIGS. 1 and 3D), into which an external memory 45 having a game program stored thereon is to be inserted. Within the insertion slot 11D, a connector (not shown) is provided for electrically connecting the game apparatus 10 and the external memory 45 in a detachable manner. The connection of the external memory 45 to the game apparatus 10 causes a processor included in internal circuitry to execute a predetermined game program. It should be noted that the connector and the insertion slot 11D may be provided on another side surface (e.g., the right side surface) of the lower housing 11.

The inner surface 21B of the upper housing 21 shown in FIG. 1 includes loudspeaker holes 21E, an upper LCD 22, an inner capturing section 24, a 3D adjustment switch 25, and a 3D indicator 26 are provided. The inner capturing section 24 is an example of a first capturing device.

The upper LCD 22 is a display device capable of displaying a stereoscopically visible image. The upper LCD 22 is capable of displaying a left-eye image and a right-eye image, using substantially the same display area. Specifically, the upper LCD 22 is a display device using a method in which the left-eye image and the right-eye image are displayed alternately in the horizontal direction in predetermined units (e.g., in every other line). It should be noted that the upper LCD 22 may be a display device using a method in which the left-eye image and the right-eye image are displayed alternately for a predetermined time. Further, the upper LCD 22 is a display device capable of displaying an image stereoscopically visible with the naked eye. In this case, a lenticular type display device or a parallax barrier type display device is used so that the left-eye image and the right-eye image that are displayed alternately in the horizontal direction can be viewed separately with the left eye and the right eye, respectively. In the first embodiment, the upper LCD 22 is a parallax-barrier-type display device. The upper LCD 22 displays an image stereoscopically visible with the naked eye (a stereoscopic image), using the right-eye image and the left-eye image. That is, the upper LCD 22 allows the user to view the left-eye image with their left eye, and the right-eye image with their right eye, using the parallax barrier. This makes it possible to display a stereoscopic image giving the user a stereoscopic effect (stereoscopically visible image). Furthermore, the upper LCD 22 is capable of disabling the parallax barrier. When disabling the parallax barrier, the upper LCD 22 is capable of displaying an image in a planar manner (the upper LCD 22 is capable of displaying a planar view image, as opposed to the stereoscopically visible image described above. This is a display mode in which the same displayed image can be viewed with both the left and right eyes.). Thus, the upper LCD 22 is a display device capable of switching between: the stereoscopic display mode for displaying a stereoscopically visible image; and the planar display mode for displaying an image in a planar manner (displaying a planar view image). The switching of the display modes is performed by the 3D adjustment switch 25 described later.

The upper LCD 22 is accommodated in the upper housing 21. A planar shape of the upper LCD 22 is a wider-than-high rectangle, and is placed at the center of the upper housing 21 such that the long side direction of the upper LCD 22 coincides with the long side direction of the upper housing 21. As an example, the area of the screen of the upper LCD 22 is set greater than that of the lower LCD 12. Specifically, the screen of the upper LCD 22 is set horizontally longer than the screen of the lower LCD 12. That is, the proportion of the width in the aspect ratio of the screen of the upper LCD 22 is set greater than that of the lower LCD 12. The screen of the upper LCD 22 is provided on the inner surface (main surface) 21B of the upper housing 21, and is exposed through an opening of the inner surface of the upper housing 21. Further, the inner surface of the upper housing 21 is covered by a transparent screen cover 27. The screen cover 27 protects the screen of the upper LCD 22, and integrates the upper LCD 22 and the inner surface of the upper housing 21, and thereby provides unity. As an example, the number of pixels of the upper LCD 22 is 800 dots×240 dots (horizontal×vertical). It should be noted that an LCD is used as the upper LCD 22 in the first embodiment. The upper LCD 22, however, is not limited to this, and a display device using EL or the like may be used. Furthermore, a display device having any resolution may be used as the upper LCD 22.

The loudspeaker holes 21E are holes through which sounds from loudspeakers 44 that serve as a sound output device of the game apparatus 10 are output. The loudspeakers holes 21E are placed symmetrically with respect to the upper LCD. Sounds from the loudspeakers 44 described later are output through the loudspeaker holes 21E.

The inner capturing section 24 functions as a capturing section having an imaging direction that is the same as the inward normal direction of the inner surface 21B of the upper housing 21. The inner capturing section 24 includes an imaging device having a predetermined resolution, and a lens. The lens may have a zoom mechanism.

The inner capturing section 24 is placed: on the inner surface 21B of the upper housing 21; above the upper edge of the screen of the upper LCD 22; and in the center of the upper housing 21 in the left-right direction (on the line dividing the upper housing 21 (the screen of the upper LCD 22) into two equal left and right portions). Such a placement of the inner capturing section 24 makes it possible that when the user views the upper LCD 22 from the front thereof, the inner capturing section 24 captures the user's face from the front thereof. A left outer capturing section 23a and a right outer capturing section 23b will be described later.

The 3D adjustment switch 25 is a slide switch, and is used to switch the display modes of the upper LCD 22 as described above. The 3D adjustment switch 25 is also used to adjust the stereoscopic effect of a stereoscopically visible image (stereoscopic image) displayed on the upper LCD 22. The 3D adjustment switch 25 is provided at an end portion shared by the inner surface and the right side surface of the upper housing 21, so as to be visible to the user, regardless of the open/closed state of the game apparatus 10. The 3D adjustment switch 25 includes a slider that is slidable to any position in a predetermined direction (e.g., the up-down direction), and the display mode of the upper LCD 22 is set in accordance with the position of the slider.

When, for example, the slider of the 3D adjustment switch 25 is placed at the lowermost position, the upper LCD 22 is set to the planar display mode, and a planar image is displayed on the screen of the upper LCD 22. It should be noted that the same image may be used as the left-eye image and the right-eye image, while the upper LCD 22 remains set to the stereoscopic display mode, and thereby performs planar display. On the other hand, when the slider is placed above the lowermost position, the upper LCD 22 is set to the stereoscopic display mode. In this case, a stereoscopically visible image is displayed on the screen of the upper LCD 22. When the slider is placed above the lowermost position, the visibility of the stereoscopic image is adjusted in accordance with the position of the slider. Specifically, the amount of deviation in the horizontal direction between the position of the right-eye image and the position of the left-eye image is adjusted in accordance with the position of the slider.

The 3D indicator 26 indicates whether or not the upper LCD 22 is in the stereoscopic display mode. For example, the 3D indicator 26 is an LED, and is lit on when the stereoscopic display mode of the upper LCD 22 is enabled. The 3D indicator 26 is placed on the inner surface 21B of the upper housing 21 near the screen of the upper LCD 22. Accordingly, when the user views the screen of the upper LCD 22 from the front thereof, the user can easily view the 3D indicator 26. This enables the user to easily recognize the display mode of the upper LCD 22 even when viewing the screen of the upper LCD 22.

FIG. 2 is a right side view showing an example of the game apparatus 10 in the open state. The right side surface of the lower housing 11 includes a second LED 16B, a wireless switch 19, and the R button 14H. The second LED 16B notifies the user of the establishment state of the wireless communication of the game apparatus 10. The game apparatus 10 is capable of wirelessly communicating with other devices, and the second LED 16B is lit on when wireless communication is established between the game apparatus 10 and other devices. The game apparatus 10 has the function of establishing connection with a wireless LAN by, for example, a method based on the IEEE 802.11.b/g standard. The wireless switch 19 enables/disables the function of the wireless communication. The R button 14H will be described later.

FIG. 3A is a left side view showing an example of the game apparatus 10 being closed (in the closed state). The left side surface of the lower housing 11 shown in FIG. 3A includes an openable and closable cover section 11C, the L button 14H, and the sound volume button 14I. The sound volume button 14I is used to adjust the sound volume of the loudspeakers of the game apparatus 10.

Within the cover section 11C, a connector (not shown) is provided for electrically connecting the game apparatus 10 and a data storage external memory 46 (see FIG. 1). The data storage external memory 46 is detachably attached to the connector. The data storage external memory 46 is used to, for example, store (save) data of an image captured by the game apparatus 10. It should be noted that the connector and the cover section 11C may be provided on the right side surface of the lower housing 11. The L button 14G will be described later.

FIG. 3B is a front view showing an example of the game apparatus 10 in the closed state. The outer surface of the upper housing 21 shown in FIG. 3B includes a left outer capturing section 23a, a right outer capturing section 23b, and a third LED 16C.

The left outer capturing section 23a and the right outer capturing section 23b each includes an imaging device (e.g., a CCD image sensor or a CMOS image sensor) having a predetermined common resolution, and a lens. The lens may have a zoom mechanism. The imaging directions of the left outer capturing section 23a and the right outer capturing section 23b (the optical axis of the camera) are each the same as the outward normal direction of the outer surface 21D. That is, the imaging direction of the left outer capturing section 23a and the imaging direction of the right outer capturing section 23b are parallel to each other. Hereinafter, the left outer capturing section 23a and the right outer capturing section 23b are collectively referred to as an "outer capturing section 23". The outer capturing section 23 is an example of a second capturing device.

The left outer capturing section 23a and the right outer capturing section 23b included in the outer capturing section 23 are placed along the horizontal direction of the screen of the upper LCD 22. That is, the left outer capturing section 23a and the right outer capturing section 23b are placed such that a straight line connecting between the left outer capturing section 23a and the right outer capturing section 23b is placed along the horizontal direction of the screen of the upper LCD 22. When the user has pivoted the upper housing 21 at a predetermined angle (e.g., 90°) relative to the lower housing 11, and views the screen of the upper LCD 22 from the front thereof, the left outer capturing section 23a is placed on the left side of the user viewing the screen, and the right outer capturing section 23b is placed on the right side of the user (see FIG. 1). The distance between the left outer capturing section 23a and the right outer capturing section 23b is set to correspond to the distance between both eyes of a person, and may be set, for example, in the range from 30 mm to 70 mm. It should be noted, however, that the distance between the left outer capturing section 23a and the right outer capturing section 23b is not limited to this range. It should be noted that in the first embodiment, the left outer capturing section 23a and the right outer capturing section 23b are fixed to the housing 21, and therefore, the imaging directions cannot be changed.

The left outer capturing section 23a and the right outer capturing section 23b are placed symmetrically with respect to the line dividing the upper LCD 22 (the upper housing 21) into two equal left and right portions. Further, the left outer capturing section 23a and the right outer capturing section 23b are placed in the upper portion of the upper housing 21 and in the back of the portion above the upper edge of the screen of the upper LCD 22, in the state where the upper housing 21 is in the open state (see FIG. 1). That is, the left outer capturing section 23a and the right outer capturing section 23b are placed on the outer surface of the upper housing 21, and, if the upper LCD 22 is projected onto the outer surface of the upper housing 21, is placed above the upper edge of the screen of the projected upper LCD 22.

Thus, the left outer capturing section 23a and the right outer capturing section 23b of the outer capturing section 23 are placed symmetrically with respect to the center line of the upper LCD 22 extending in the transverse direction. This makes it possible that when the user views the upper LCD 22 from the front thereof, the imaging directions of the outer capturing section 23 coincide with the directions of the respective lines of sight of the user's right and left eyes.

Further, the outer capturing section 23 is placed in the back of the portion above the upper edge of the screen of the upper LCD 22, and therefore, the outer capturing section 23 and the upper LCD 22 do not interfere with each other inside the upper housing 21. Further, when the inner capturing section 24 provided on the inner surface of the upper housing 21 as shown by a dashed line in FIG. 3B is projected onto the outer surface of the upper housing 21, the left outer capturing section 23a and the right outer capturing section 23b are placed symmetrically with respect to the projected inner capturing section 24. This makes it possible to reduce the upper housing 21 in thickness as compared to the case where the outer capturing section 23 is placed in the back of the screen of the upper LCD 22, or the case where the outer capturing section 23 is placed in the back of the inner capturing section 24.

The left outer capturing section 23a and the right outer capturing section 23b can be used as a stereo camera, depending on the program executed by the game apparatus 10. Alternatively, either one of the two outer capturing sections (the left outer capturing section 23a and the right outer capturing section 23b) may be used solely, so that the outer capturing section 23 can also be used as a non-stereo camera, depending on the program. When a program is executed for causing the left outer capturing section 23a and the right outer capturing section 23b to function as a stereo camera, the left outer capturing section 23a captures a left-eye image, which is to be viewed with the user's left eye, and the right outer capturing section 23b captures a right-eye image, which is to be viewed with the user's right eye. Yet alternatively, depending on the program, images captured by the two outer capturing sections (the left outer capturing section 23a and the right outer capturing section 23b) may be combined together, or may be used to compensate for each other, so that imaging can be performed with an extended imaging range. Yet alternatively, a left-eye image and a right-eye image that have a parallax may be generated from a single image captured using one of the outer capturing sections 23a and 23b, and a pseudo-stereo image as if captured by two cameras can be generated. To generate the pseudo-stereo image, it is possible to appropriately set the distance between virtual cameras.

The third LED 16C is lit on when the outer capturing section 23 is operating, and informs that the outer capturing section 23 is operating. The third LED 16C is provided near the outer capturing section 23 on the outer surface of the upper housing 21.

FIG. 3C is a right side view showing an example of the game apparatus 10 in the closed state. FIG. 3D is a rear view showing an example of the game apparatus 10 in the closed state.

The L button 14G and the R button 14H are provided on the upper side surface of the lower housing 11 shown in FIG. 3D. The L button 14G is provided at the left end portion of the upper side surface of the lower housing 11, and the R button 14H is provided at the right end portion of the upper side surface of the lower housing 11. The L button 14G and the R button 14H are appropriately assigned functions, respectively, in accordance with the program executed by the game apparatus 10. For example, the L button 14G and the R button 14H function as shutter buttons (capturing instruction buttons) of the capturing sections described above.

It should be noted that although not shown in the figures, a rechargeable battery that serves as the power supply of the game apparatus 10 is accommodated in the lower housing 11, and the battery can be charged through a terminal provided on the side surface (e.g., the upper side surface) of the lower housing 11.

Figure 4:
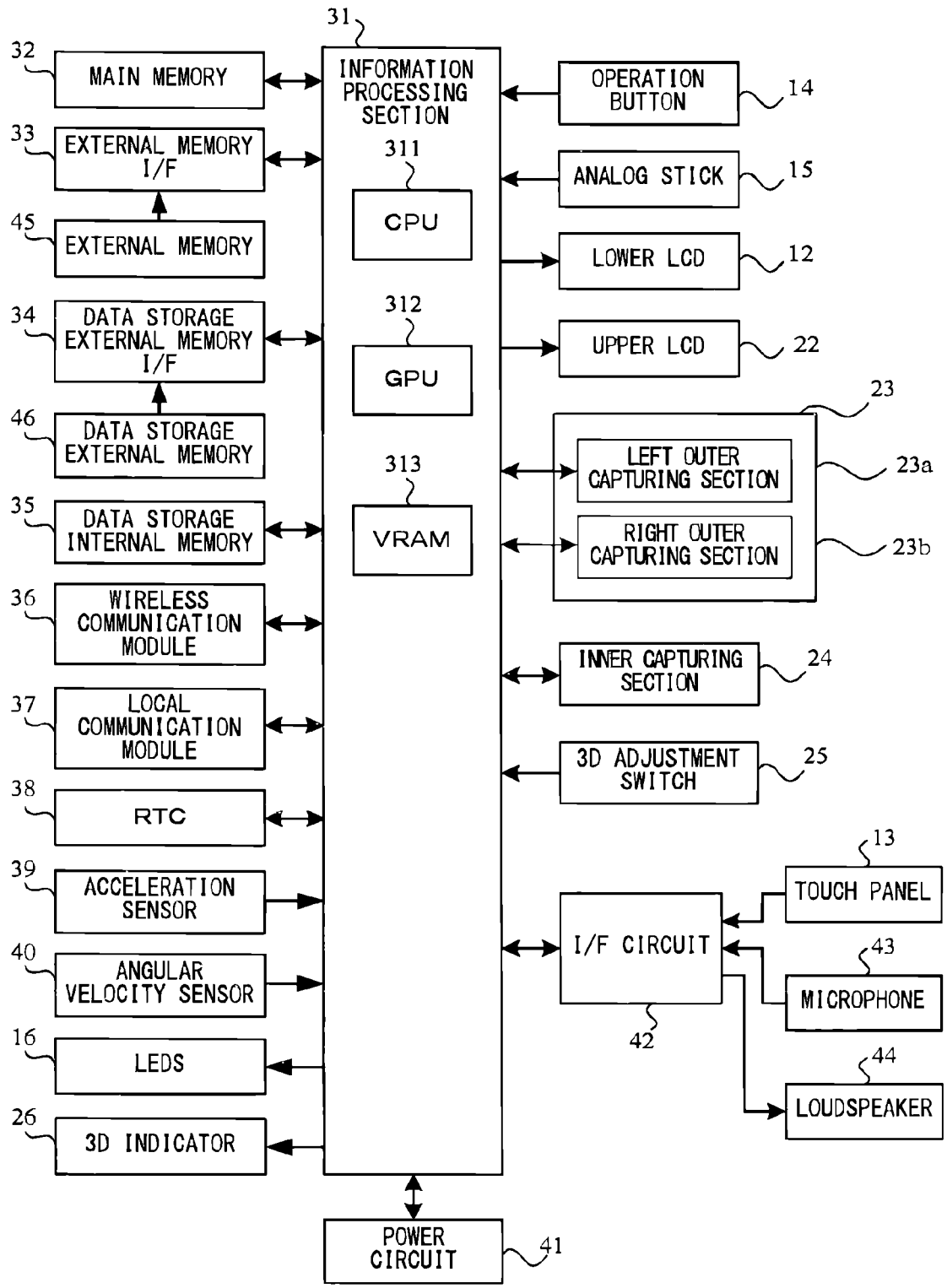
FIG. 4 is a block diagram showing an example of the internal configuration of the game apparatus 10.

FIG. 4 is a block diagram showing an example of the internal configuration of the game apparatus 10. The game apparatus 10 includes, as well as the components described above, electronic components, such as an information processing section 31, a main memory 32, an external memory interface (external memory I/F) 33, a data storage external memory I/F 34, a data storage internal memory 35, a wireless communication module 36, a local communication module 37, a real-time clock (RTC) 38, an acceleration sensor 39, an angular velocity sensor 40, a power circuit 41, and an interface circuit (I/F circuit) 42. These electronic components are mounted on electronic circuit boards, and are accommodated in the lower housing 11, or may be accommodated in the upper housing 21.

The information processing section 31 is information processing means including a central processing unit (CPU) 311 that executes a predetermined program, a graphics processing unit (GPU) 312 that performs image processing, and the like. In the first embodiment, a predetermined program is stored in a memory (e.g., the external memory 45 connected to the external memory I/F 33, or the data storage internal memory 35) included in the game apparatus 10. The CPU 311 of the information processing section 31 executes the predetermined program, and thereby performs the image processing described later or game processing. It should be noted that the program executed by the CPU 311 of the information processing section 31 may be acquired from another device by communication with said another device. The information processing section 31 further includes a video RAM (VRAM) 313. The GPU 312 of the information processing section 31 generates an image in accordance with an instruction from the CPU 311 of the information processing section 31, and draws the image in the VRAM 313. The GPU 312 of the information processing section 31 outputs the image drawn in the VRAM 313 to the upper LCD 22 and/or the lower LCD 12, and the image is displayed on the upper LCD 22 and/or the lower LCD 12.

To the information processing section 31, the main memory 32, the external memory I/F 33, the data storage external memory I/F 34, and the data storage internal memory 35 are connected. The external memory I/F 33 is an interface for establishing a detachable connection with the external memory 45. The data storage external memory I/F 34 is an interface for establishing a detachable connection with the data storage external memory 46.

The main memory 32 is volatile storage means used as a work area or a buffer area of the information processing section 31 (the CPU 311). That is, the main memory 32 temporarily stores various types of data used for image processing or game processing, and also temporarily stores a program acquired from outside (the external memory 45, another device, or the like) the game apparatus 10. In the first embodiment, the main memory 32 is, for example, a pseudo SRAM (PSRAM).

The external memory 45 is nonvolatile storage means for storing the program executed by the information processing section 31. The external memory 45 is composed of, for example, a read-only semiconductor memory. When the external memory 45 is connected to the external memory I/F 33, the information processing section 31 can load a program stored in the external memory 45. In accordance with the execution of the program loaded by the information processing section 31, a predetermined process is performed. The data storage external memory 46 is composed of a readable/writable non-volatile memory (e.g., a NAND flash memory), and is used to store predetermined data. For example, the data storage external memory 46 stores images captured by the outer capturing section 23 and/or images captured by another device. When the data storage external memory 46 is connected to the data storage external memory I/F 34, the information processing section 31 loads an image stored in the data storage external memory 46, and the image can be displayed on the upper LCD 22 and/or the lower LCD 12.

The data storage internal memory 35 is composed of a readable/writable non-volatile memory (e.g., a NAND flash memory), and is used to store predetermined data. For example, the data storage internal memory 35 stores data and/or programs downloaded by wireless communication through the wireless communication module 36.

The wireless communication module 36 has the function of establishing connection with a wireless LAN by, for example, a method based on the IEEE 802.11.b/g standard. Further, the local communication module 37 has the function of wirelessly communicating with another game apparatus of the same type by a predetermined communication method (e.g., infrared communication). The wireless communication module 36 and the local communication module 37 are connected to the information processing section 31. The information processing section 31 is capable of transmitting and receiving data to and from another device via the Internet, using the wireless communication module 36, and is capable of transmitting and receiving data to and from another game apparatus of the same type, using the local communication module 37.

The acceleration sensor 39 is connected to the information processing section 31. The acceleration sensor 39 can detect the magnitudes of accelerations (linear accelerations) in the directions of straight lines along three axial (x, y, and z axes in the present embodiment) directions, respectively. The acceleration sensor 39 is provided, for example, within the lower housing 11. As shown in FIG. 1, the long side direction of the lower housing 11 is defined as an x-axis direction; the short side direction of the lower housing 11 is defined as a y-axis direction; and the direction perpendicular to the inner surface (main surface) of the lower housing 11 is defined as a z-axis direction. The acceleration sensor 39 thus detects the magnitudes of the linear accelerations produced in the respective axial directions. It should be noted that the acceleration sensor 39 is, for example, an electrostatic capacitance type acceleration sensor, but may be an acceleration sensor of another type. Further, the acceleration sensor 39 may be an acceleration sensor for detecting an acceleration in one axial direction, or accelerations in two axial directions. The information processing section 31 receives data indicating the accelerations detected by the acceleration sensor 39 (acceleration data), and calculates the orientation and the motion of the game apparatus 10.

The angular velocity sensor 40 is connected to the information processing section 31. The angular velocity sensor 40 detects angular velocities generated about three axes (x, y, and z axes in the present embodiment) of the game apparatus 10, respectively, and outputs data indicating the detected angular velocities (angular velocity data) to the information processing section 31. The angular velocity sensor 40 is provided, for example, within the lower housing 11. The information processing section 31 receives the angular velocity data output from the angular velocity sensor 40, and calculates the orientation and the motion of the game apparatus 10.

The RTC 38 and the power circuit 41 are connected to the information processing section 31. The RTC 38 counts time, and outputs the counted time to the information processing section 31. The information processing section 31 calculates the current time (date) based on the time counted by the RTC 38. The power circuit 41 controls the power from the power supply (the rechargeable battery accommodated in the lower housing 11, which is described above) of the game apparatus 10, and supplies power to each component of the game apparatus 10.

The I/F circuit 42 is connected to the information processing section 31. A microphone 43, a loudspeaker 44, and the touch panel 13 are connected to the I/F circuit 42. Specifically, the loudspeaker 44 is connected to the I/F circuit 42 through an amplifier not shown in the figures. The microphone 43 detects a sound from the user, and outputs a sound signal to the I/F circuit 42. The amplifier amplifies the sound signal from the I/F circuit 42, and outputs the sound from the loudspeaker 44. The I/F circuit 42 includes: a sound control circuit that controls the microphone 43 and the loudspeaker 44 (amplifier); and a touch panel control circuit that controls the touch panel 13. For example, the sound control circuit performs A/D conversion and D/A conversion on the sound signal, and converts the sound signal to sound data in a predetermined format. The touch panel control circuit generates touch position data in a predetermined format, based on a signal from the touch panel 13, and outputs the touch position data to the information processing section 31. The touch position data indicates the coordinates of the position (touch position), on the input surface of the touch panel 13, at which an input has been provided. It should be noted that the touch panel control circuit reads a signal from the touch panel 13, and generates the touch position data, once in a predetermined time. The information processing section 31 acquires the touch position data, and thereby recognizes the touch position, at which the input has been provided on the touch panel 13.

An operation button 14 includes the operation buttons 14A through 14L described above, and is connected to the information processing section 31. Operation data is output from the operation button 14 to the information processing section 31, the operation data indicating the states of inputs provided to the respective operation buttons 14A through 14I (indicating whether or not the operation buttons 14A through 14I have been pressed). The information processing section 31 acquires the operation data from the operation button 14, and thereby performs processes in accordance with the inputs provided to the operation button 14.

The lower LCD 12 and the upper LCD 22 are connected to the information processing section 31. The lower LCD 12 and the upper LCD 22 each display an image in accordance with an instruction from the information processing section 31 (the GPU 312). In the first embodiment, the information processing section 31 causes the lower LCD 12 to display an image for a hand-drawn image input operation, and causes the upper LCD 22 to display an image acquired from either one of the outer capturing section 23 and the inner capturing section 24. That is, for example, the information processing section 31 causes the upper LCD 22 to display a stereoscopic image (stereoscopically visible image) using a right-eye image and a left-eye image that are captured by the inner capturing section 24, or causes the upper LCD 22 to display a planar image using one of a right-eye image and a left-eye image that are captured by the outer capturing section 23.

Specifically, the information processing section 31 is connected to an LCD controller (not shown) of the upper LCD 22, and causes the LCD controller to set the parallax barrier to on/off. When the parallax barrier is on in the upper LCD 22, a right-eye image and a left-eye image that are stored in the VRAM 313 of the information processing section 31 (that are captured by the outer capturing section 23) are output to the upper LCD 22. More specifically, the LCD controller repeatedly alternates the reading of pixel data of the right-eye image for one line in the vertical direction, and the reading of pixel data of the left-eye image for one line in the vertical direction, and thereby reads the right-eye image and the left-eye image from the VRAM 313. Thus, the right-eye image and the left-eye image are each divided into strip images, each of which has one line of pixels placed in the vertical direction, and an image including the divided left-eye strip images and the divided right-eye strip images alternately placed is displayed on the screen of the upper LCD 22. The user views the images through the parallax barrier of the upper LCD 22, whereby the right-eye image is viewed with the user's right eye, and the left-eye image is viewed with the user's left eye. This causes the stereoscopically visible image to be displayed on the screen of the upper LCD 22.

The outer capturing section 23 and the inner capturing section 24 are connected to the information processing section 31. The outer capturing section 23 and the inner capturing section 24 each capture an image in accordance with an instruction from the information processing section 31, and output data of the captured image to the information processing section 31. In the first embodiment, the information processing section 31 gives either one of the outer capturing section 23 and the inner capturing section 24 an instruction to capture an image, and the capturing section that has received the instruction captures an image, and transmits data of the captured image to the information processing section 31. Specifically, the user selects the capturing section to be used, through an operation using the touch panel 13 and the operation button 14. The information processing section 31 (the CPU 311) detects that an capturing section has been selected, and the information processing section 31 gives the selected one of the outer capturing section 23 and the inner capturing section 24 an instruction to capture an image.

When started by an instruction from the information processing section 31 (CPU 311), the outer capturing section 23 and the inner capturing section 24 perform capturing at, for example, a speed of 60 images per second. The captured images captured by the outer capturing section 23 and the inner capturing section 24 are sequentially transmitted to the information processing section 31, and displayed on the upper LCD 22 or the lower LCD 12 by the information processing section 31 (GPU 312). When output to the information processing section 31, the captured images are stored in the VRAM 313, are output to the upper LCD 22 or the lower LCD 12, and are deleted at predetermined times. Thus, images are captured at, for example, a speed of 60 images per second, and the captured images are displayed, whereby the game apparatus 10 can display views in the imaging ranges of the outer capturing section 23 and the inner capturing section 24, on the upper LCD 22 of the lower LCD 12 in real time.

The 3D adjustment switch 25 is connected to the information processing section 31. The 3D adjustment switch 25 transmits to the information processing section 31 an electrical signal in accordance with the position of the slider.

The 3D indicator 26 is connected to the information processing section 31. The information processing section 31 controls whether or not the 3D indicator 26 is to be lit on. When, for example, the upper LCD 22 is in the stereoscopic display mode, the information processing section 31 lights on the 3D indicator 26.

FIG. 5A-1 shows an example of an application flowchart for the control of objects on a stereoscopic display. The application may be executed, for example, using game apparatus 10. The system begins in S1 where a location of an object is determined on a stereoscopic display. Although not limited to this embodiment, the location of the object on the stereoscopic display can be represented by a 3-D coordinate (i.e., "X-Y-Z") value.

Once the system determines the object's location, the system proceeds to S2 where it determines a measurement of the perceived visual distance of the object from the display. Although not limited to this embodiment, the system can determine a measurement of the object's visual distance from the stereoscopic display by measuring its perceived position in a 3-D device space which represents a real 3-D space. From this, the object's perceived visual distance from the display (i.e., which corresponds to the actual distance in a real 3-D space) is determined. It should be appreciated that the perceived position may be either behind or in front of the display, resulting in a correspondingly negative or positive distance.

After measuring the object's distance from the stereoscopic display, the system proceeds to S3 where it determines if the object exceeds a threshold value. In another embodiment, the object can be equal to or exceeding the threshold value. The system may perform steps S1-S3, for example, on each generated image (i.e., each generated frame). Some of the criteria for determining if the object exceeds the threshold value will be discussed in further detail below in the discussion of FIG. 5B.

In the embodiment shown in FIG. 5A-1, the system thus determines whether the object's distance in front of the stereoscopic display reaches a maximum limit, this maximum limit being variable based on, for example, the type of object and/or gameplay status. An example distance for this maximum limit is a value in the range of 1-3 centimeters. For example, if the variable maximum limit is set to 2 centimeters, the object will begin to be transitioned (as discussed below in step S4) once the object is perceived in the 3D device space (corresponding to the real 3D space) to have distance which is more than 2 centimeters in front of the stereoscopic display.

If the object does not exceed the threshold value, the system repeats S1 through S3 and continues to measure the object's perceived distance from the stereoscopic display. If the object does exceed the threshold value, the system proceeds to S4 where the object will be transitioned from the 3-D stereoscopic display. The further details of S4 are discussed below in the discussion of FIG. 5C. It should be appreciated that the process depicted in S1-S4 in FIG. 5A occurs, in an exemplary embodiment, for each frame in which the system displays the game environment.

FIG. 5A-2 depicts another embodiment for transitioning the objects to/from the stereoscopic display. The system begins in step S1 where the system will determine the location of the object in a virtual space. In an example embodiment, the virtual space can be referred to as the world space. Prior to drawing the objects on the display, the coordinates and/or positions of the objects in the virtual space will be translated into the device space. Once their coordinates and/or positions are known in the device space, the objects can then be drawn onto the display.

After determining the location of the object in the virtual space, the system proceeds to step S2 where the system measures the distance of the object from the virtual camera. The distance measured in step S2 of FIG. 5A-2 is thus measurable in the virtual space. After determining the object's virtual distance from the virtual camera, the system proceeds to step S3 where it determines if the object's distance exceeds or comes within a threshold value. In this example embodiment, the system can determine if the object falls below a threshold value because the object will have a shorter visual distance the closer it gets to the virtual camera. If the object's distance does not fall below the threshold value, the system repeats steps S1-S3 as mentioned above. If the object's distance falls below the threshold value (i.e., the object's virtual distance from the virtual camera is less than the threshold distance), the appearance of the object is transitioned in step S4, as described further below.

Figures 3, 5A:
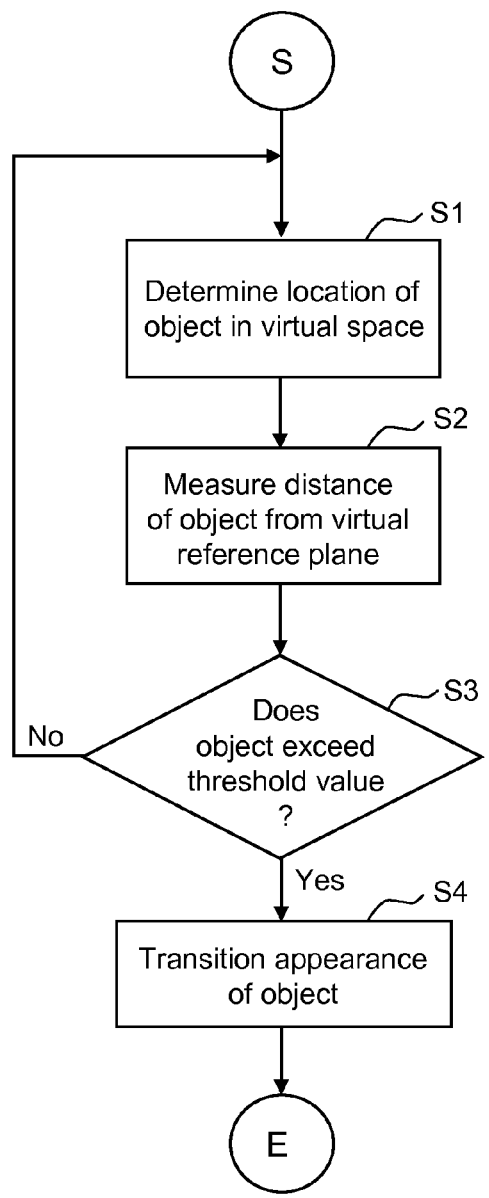

FIG. 5A-3 depicts another example embodiment for transitioning the objects to/from the stereoscopic display. The system begins in step S1 where the system will determine the location of the object in a virtual space. After determining the object's location in the virtual space, the system proceeds to step S2 where it determines how far the object is from a reference plane in the virtual space based on its location in the virtual space. The reference plane in the virtual space can correspond to, for example, the display surface of the stereoscopic display in the device space.

After determining how far the object is from the reference plane in the virtual space, the system proceeds to step S3 where it determines if the object's distance exceeds a threshold value. If the object's distance from the reference plane does not exceed the threshold value, the system will repeat steps S1-S3, as mentioned above. If the object's distance from the reference plane exceeds the threshold value (i.e., the virtual distance of the virtual object in the virtual space is greater than the threshold value), the system proceeds to step S4 where the appearance of the object is transitioned, as described in further detail below.

Figure 5B:
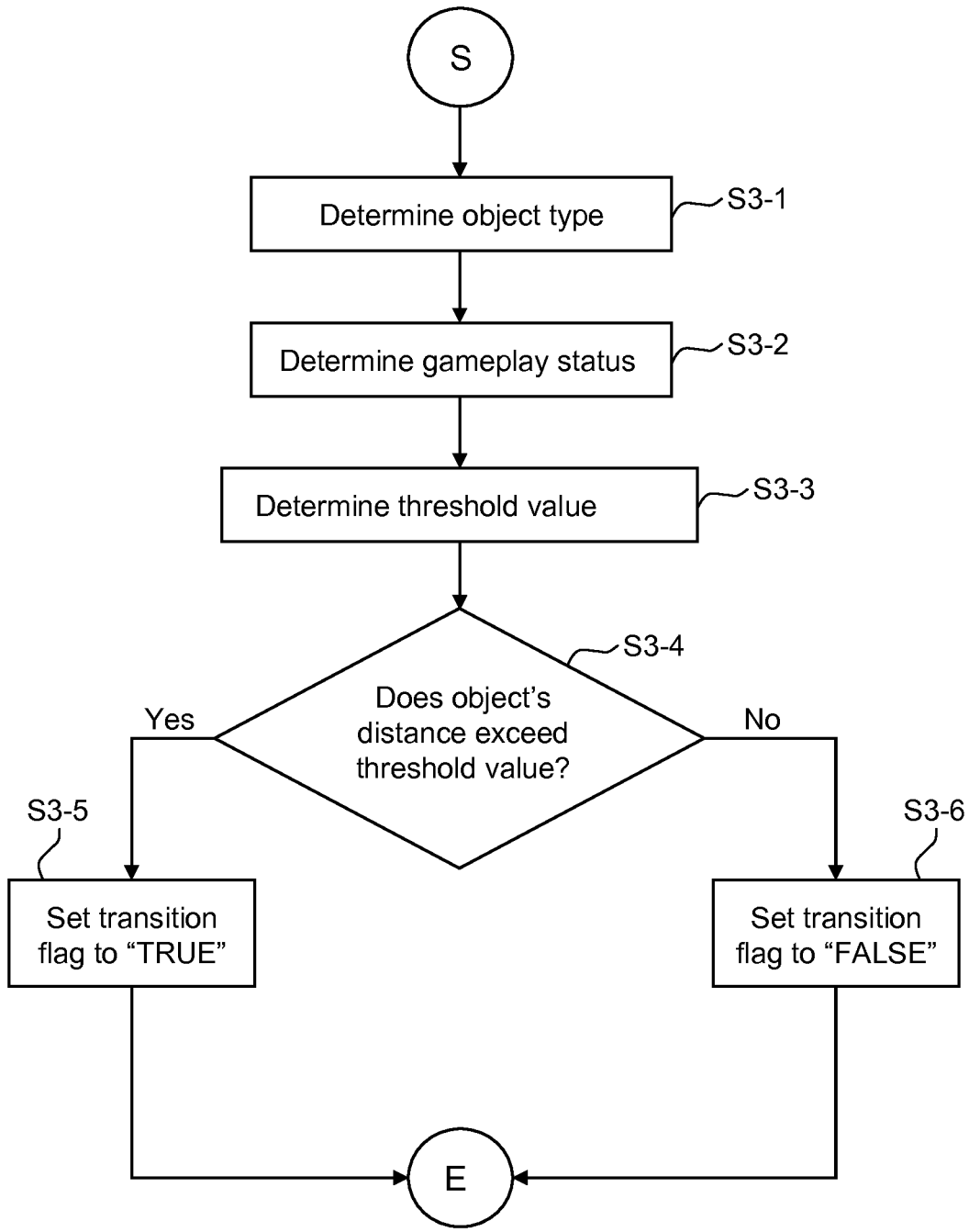

FIG. 5B shows an example of an application flowchart for determining if an object exceeds a threshold value when measuring the object's perceived distance from the stereoscopic display in FIG. 5A-1. The system begins in S3-1 where it determines a type of the object. Although not limited to this list of examples, the object could be a player character, an enemy character, a co-op player character, or a visual prop. As described below, the object's type helps determine the threshold value of the object.

Once the system determines the object's type, the system proceeds to step S3-2 where the system determines the gameplay state. Although not limited to this example, the gameplay state could be a time of a game story line, where a player character may be battling a boss character. The gameplay state could also refer to the state in which the player character is moving (i.e. running versus walking). The gameplay state could also refer to where the player character (or other object to be transitioned out) appears on the display.

After determining both the object type and the gameplay state, the system proceeds to S3-3 where it determines the threshold value for the object. Although not limited to these factors, in determining the threshold value, the system takes into account the object type and the gameplay state. For example, an object type of a boss character in battle mode with the boss character may have a higher threshold value than a character type of a prop in a game state where the player character is walking around and not in any particular battle mode.

As another example, an object appearing at or near a periphery of the displayed screen may have a lower threshold value than that same object appearing at or near the center of the displayed screen. This creates the effect that the object appearing at or near a periphery of the displayed screen may be transitioned out sooner (i.e., when a lesser distance in front of the stereoscopic display is reached as the object appears moving "out" from the display screen and "toward" the user) than when that same object appears at or near the center of the displayed screen. This is also true for objects that come close to the virtual camera (less than a predetermined distance from the virtual camera) as discussed with respect to FIG. 5A-2 or for objects that exceed a distance from a predefined reference plane as discussed with respect to FIG. 5A-3.

Once the threshold value is established for the object in S3-3, the system proceeds to S3-4 where it determines if the object's distance from the stereoscopic display exceeds the threshold value. In step S3-4, the system can alternatively determine if the object's distance from the virtual camera comes within the threshold value as discussed with respect to FIG. 5A-2. Likewise, in step S3-4 the system can further determine of the object exceeds a distance from a predefined reference plane as discussed with respect to FIG. 5A-3. If so, the system sets an object transition flag to "TRUE" in S3-5. If the object does not exceed/come within the threshold value, the system sets an object transition flag to "FALSE" in S3-6.

FIG. 5C shows an example of an application flowchart for transitioning an object from the stereoscopic display when the object's distance exceeds the threshold value. As explained in the discussion of FIGS. 5A1-3 and 5B, if the object exceeds/comes within the threshold value, the system will begin transitioning the object from the stereoscopic display.

The system begins transitioning the object in S4-1 where it determines the object's transition amount. The object's transition amount is determined based upon a transition target amount. For example, a transition target amount can refer to the object's opacity or transparency. So for example, a transition target amount of '1' may refer to targeting the object to be fully opaque where a transition target amount of '0' may refer to targeting the object to be fully transparent. Therefore, the object's transition amount may refer to the amount the object should transition during each frame. So if the target is fully opaque but needs to become transparent, the transition target amount will be set to '0' and the object's transition amount may be 0.05. As such, each frame will transition the object closer to the transition target amount. So after the first frame, the target's opacity (or transparency) will decrease to 0.95. Likewise, after the second frame the target's opacity will decrease to 0.90. In an exemplary embodiment, this will continue until the object reaches its transition target amount (i.e. '0').

In an alternative embodiment, an object's transition amount can directly correlate to the object's distance from the stereoscopic display and/or virtual camera. For example, an object closer to the display will appear more opaque where an object farther from the display will appear more transparent. As another example, an object farther from the virtual camera will appear more opaque where an object closer to the virtual camera will appear more transparent.

Once the object's transition amount has been determined, the system proceeds to S4-2 where it performs a transition of the object from the display. Although not limited to this embodiment, the object's transition amount will determine the amount that the object will change in transition from its current display state, as explained above. The visual transition of the object can be performed using a linear alpha blending of the object. As explained above, the object will gradually transition on the display based on the object's transition amount.

After transitioning the appearance of the object, the system advances to S4-3 where it determines if the object is completely transitioned on the display. If the object is not completely transitioned on the display, the system repeats S4-1 and S4-2 until the object is completely transitioned on the display. For example, if the object is fully opaque and is to completely fade from the display, the system will continually make the object more transparent until it is removed from the display.

It should be appreciated that if it is determined that the object exceeds/comes within the threshold value, the system in an exemplary embodiment, will begin transitioning the object on the display for a preset amount of time. For example, if the object is fully opaque and exceeds/comes within the threshold value, the object will begin fading from the display over a preset interval of time. Although not limited to this embodiment, the preset interval of time could be 1 second. So, for example, in 1 second the object will transition from being fully opaque to being completely transparent (i.e. removed from the display).

It should also be appreciated that the above-mentioned process can be applied to situations where the object is to both "fade-out" from the display and "fade-in" to the display. Although the examples given above generally refer to the object "fading-out" from the display, the same above process can be applied to objects that are "fading-in" to the display. So an object that will be coming back in to the display will transition from being completely transparent to being completely opaque using the above-described process.

It should also be appreciated that the above-described process can be applied if the object is in mid-transition. So for example, if the object is transitioning from full opacity to full transparency and the system decides to reverse the process and return the object to full opacity, the system can "fade-in" the object even in the midst of the object "fading-out." So if the object's opacity is 0.55 and transitioning towards transparency (i.e. '0'), the system can reset the object's transition target amount from '0' to '1' and being incrementing the target's opacity value to reach '1.'

Figure 6A:
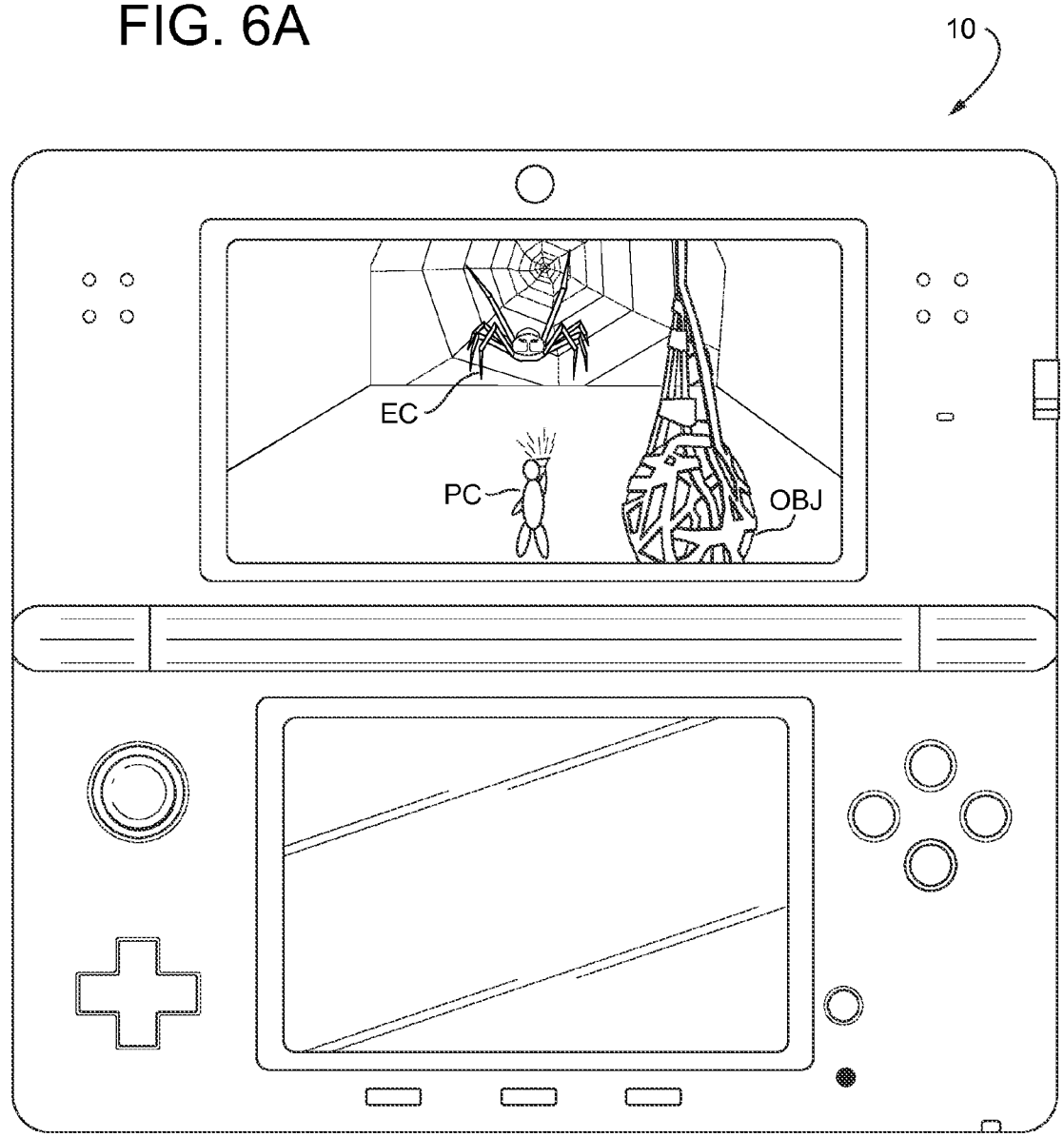
FIGS. 6A-C are exemplary diagrams showing an example implementation of the present system on the game apparatus 10.

FIG. 6A shows a diagram example embodiment of the present system where an object OBJ visually transitions from the display of the game apparatus 10. In the example shown in FIG. 6A, a player character PC is walking towards an enemy character EC. To the right of the player character PC, and "behind" the player character PC, is an object OBJ hanging from a virtual ceiling. In a preferred embodiment, the enemy character EC, the player character PC, and the object OBJ are projected as 3-D objects on the 3-D display.

Figure 6B:
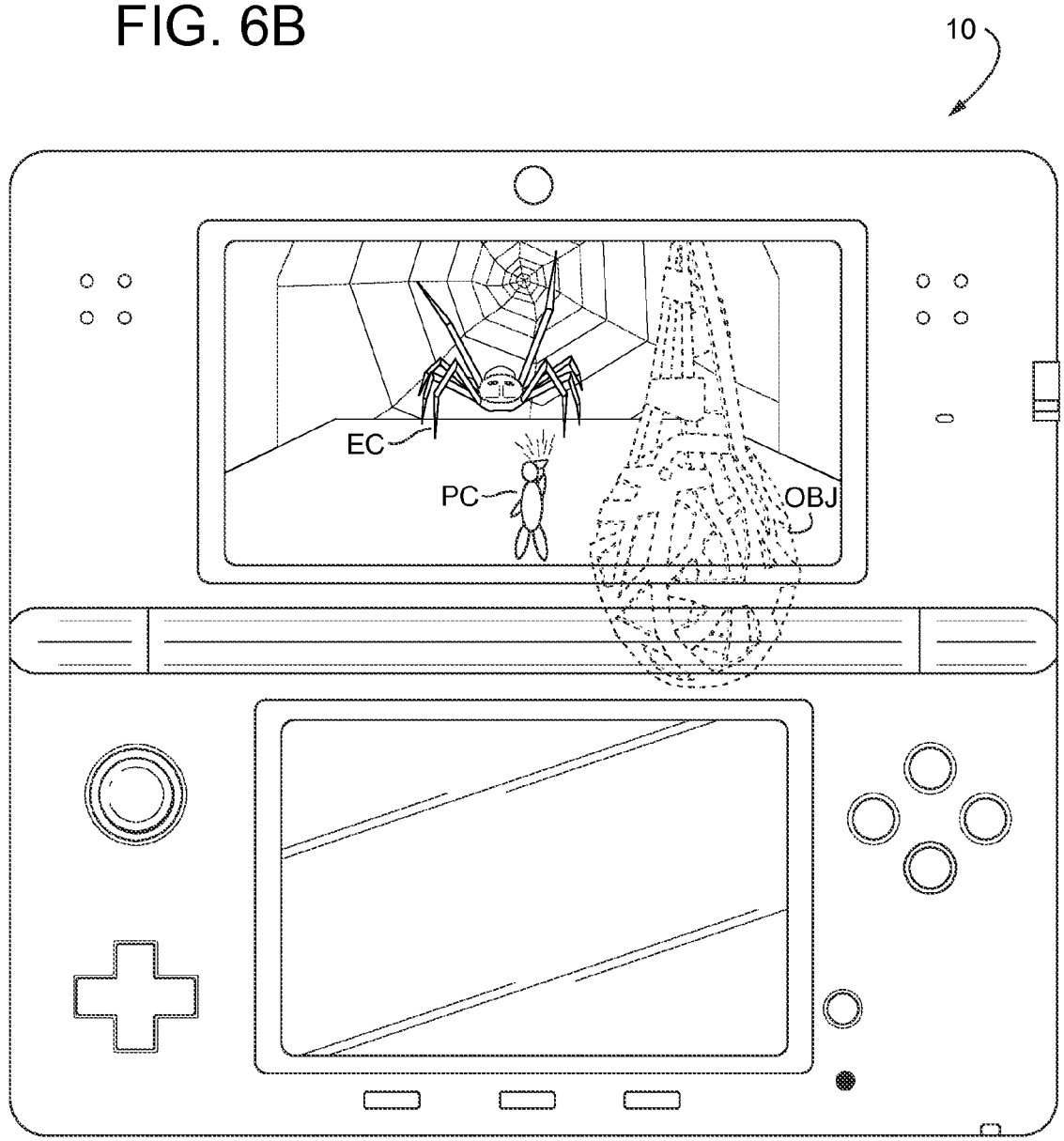

In FIG. 6B, the player character PC continues to move towards the enemy character EC. As the player character PC moves forward, the virtual camera follows the player character PC, causing the foreground to move "out" from the display. As shown in FIG. 6B, the foreground object OBJ projects "out" from the stereoscopic display so as to come out towards the viewer. At the same time, the object OBJ begins fading from view. This way, the object will appear as though it is still coming towards the viewer but will fade out of view so as not to distract the viewer or appear unnatural. As explained above, the fading can be performed using a linear alpha blending, for example. As further explained above, the object OBJ slowly fades from the display over a set interval of time, in an exemplary embodiment.

Figure 6C:
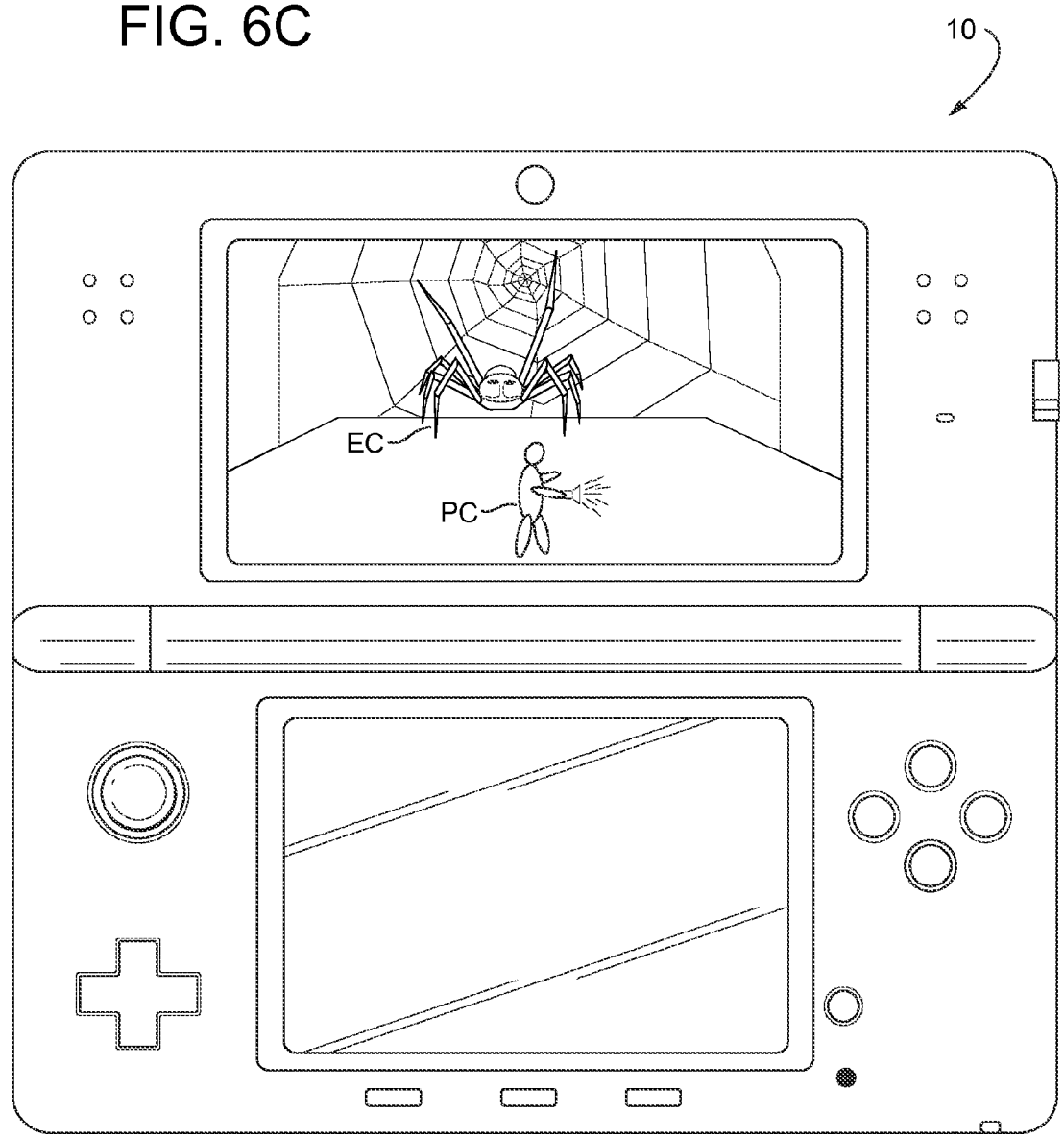

In FIG. 6C, enough time has passed so that the object OBJ has made a complete transition through the process as explained in the discussion of FIG. 5C. At this point, the object OBJ shown in FIGS. 6A and 6B has transitioned so that it is entirely faded and no longer viewable. As mentioned above, the object OBJ is opaque and then continually fades as it moves "out' farther from the stereoscopic display. As such, the object OBJ will transition from being entirely opaque to being entirely transparent, for example.

Figure 7A:
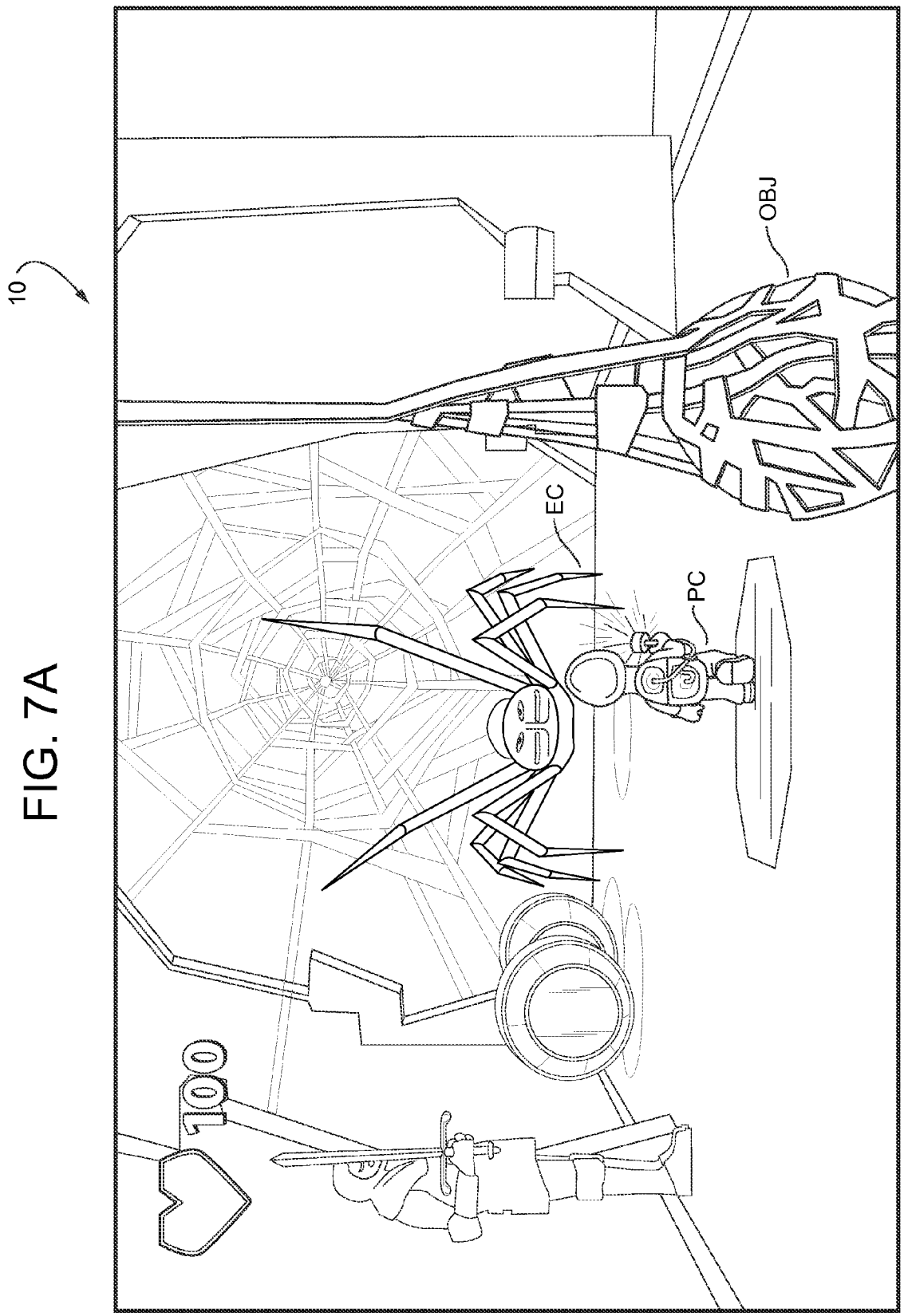
Figure 7B:
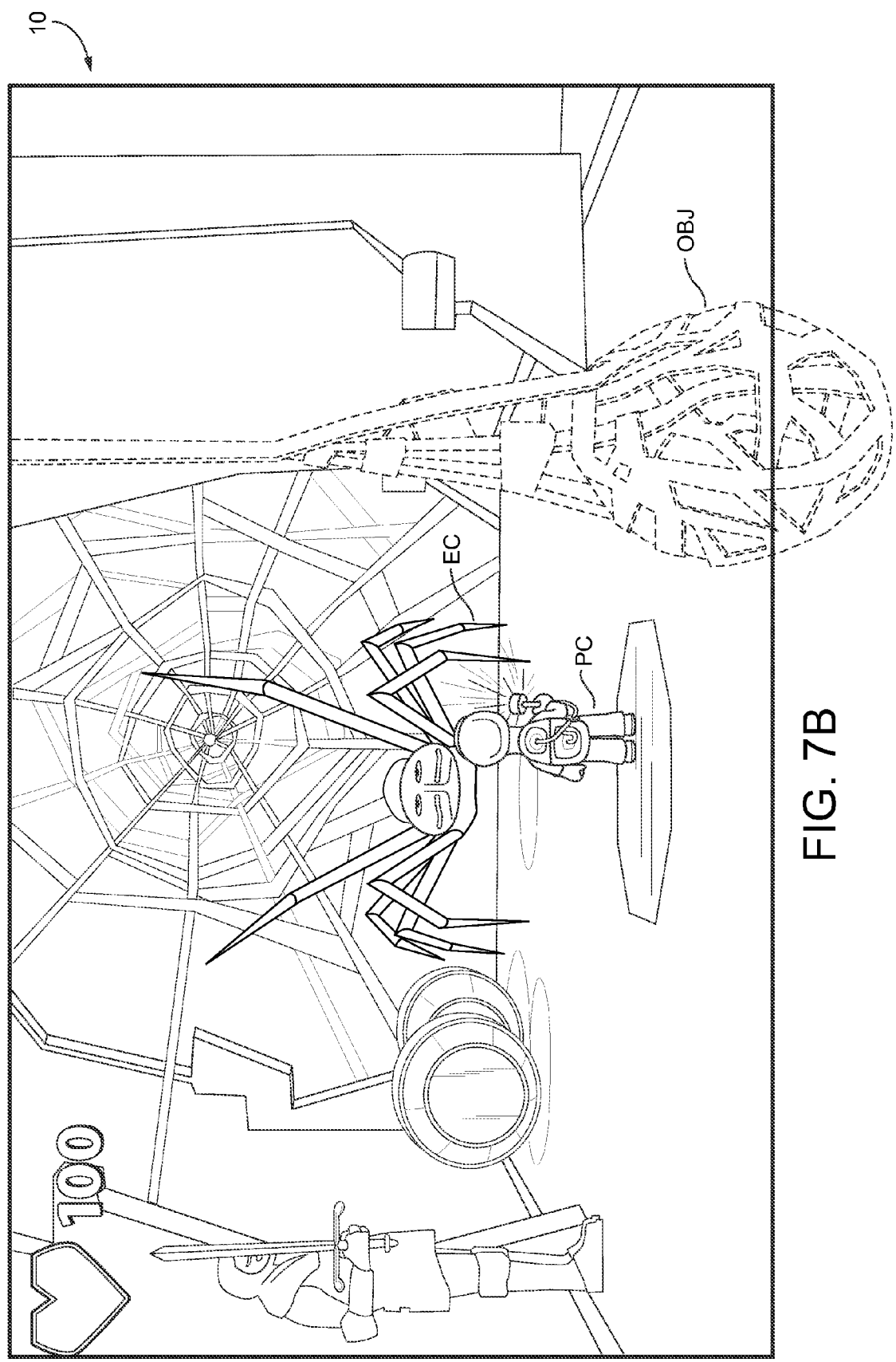

FIGS. 7A-C show examples of the present system. In FIG. 7A, the player character is walking toward the enemy character while an object hangs from the ceiling to the right, and behind the player character. In this embodiment, the enemy character is a spider and that player character is approaching the spider near its web.

In FIG. 7B, the player character walks closer to the enemy character. As the player character moves forward in this example, the background follows the movement of the player character. For example, the hallway will move toward the viewer as the player character moves forward because the virtual camera is essentially walking down the hallway with the player character. As can be seen in FIG. 7B, the object hanging from the ceiling to the right of the player character begins to slowly fade out of view from the screen. In FIG. 7B, the object is partially transparent so that it is still visible but the viewer can see through the object.

FIG. 7C shows the player character moving even closer to the enemy character. In this example, the object that was visible in FIGS. 7A and 7B is no longer visible as it has completely faded from the display. This way, the object disappears before it distracts the viewer or appears unnatural.

Figure 8B:
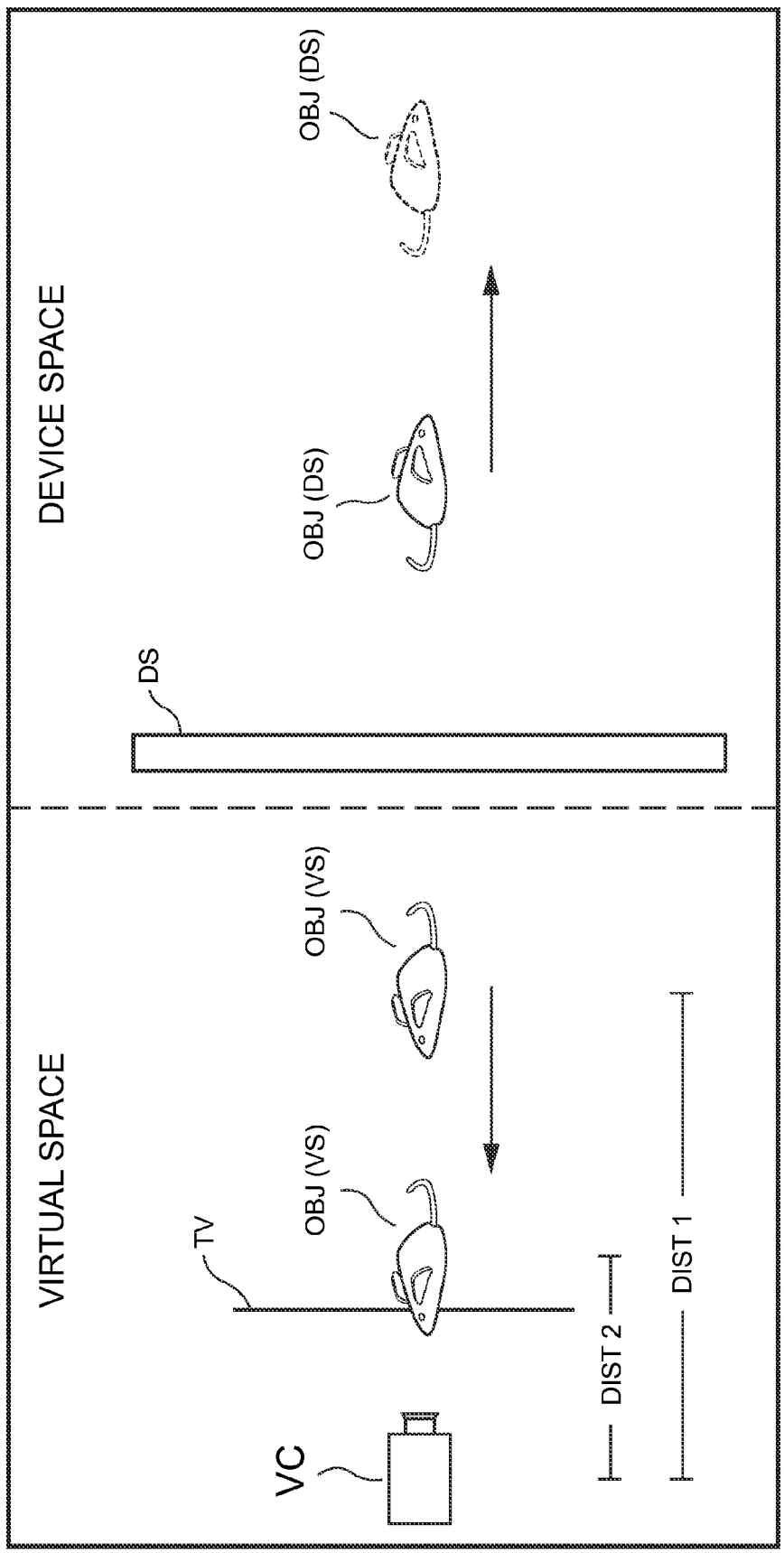
Figure 8C:
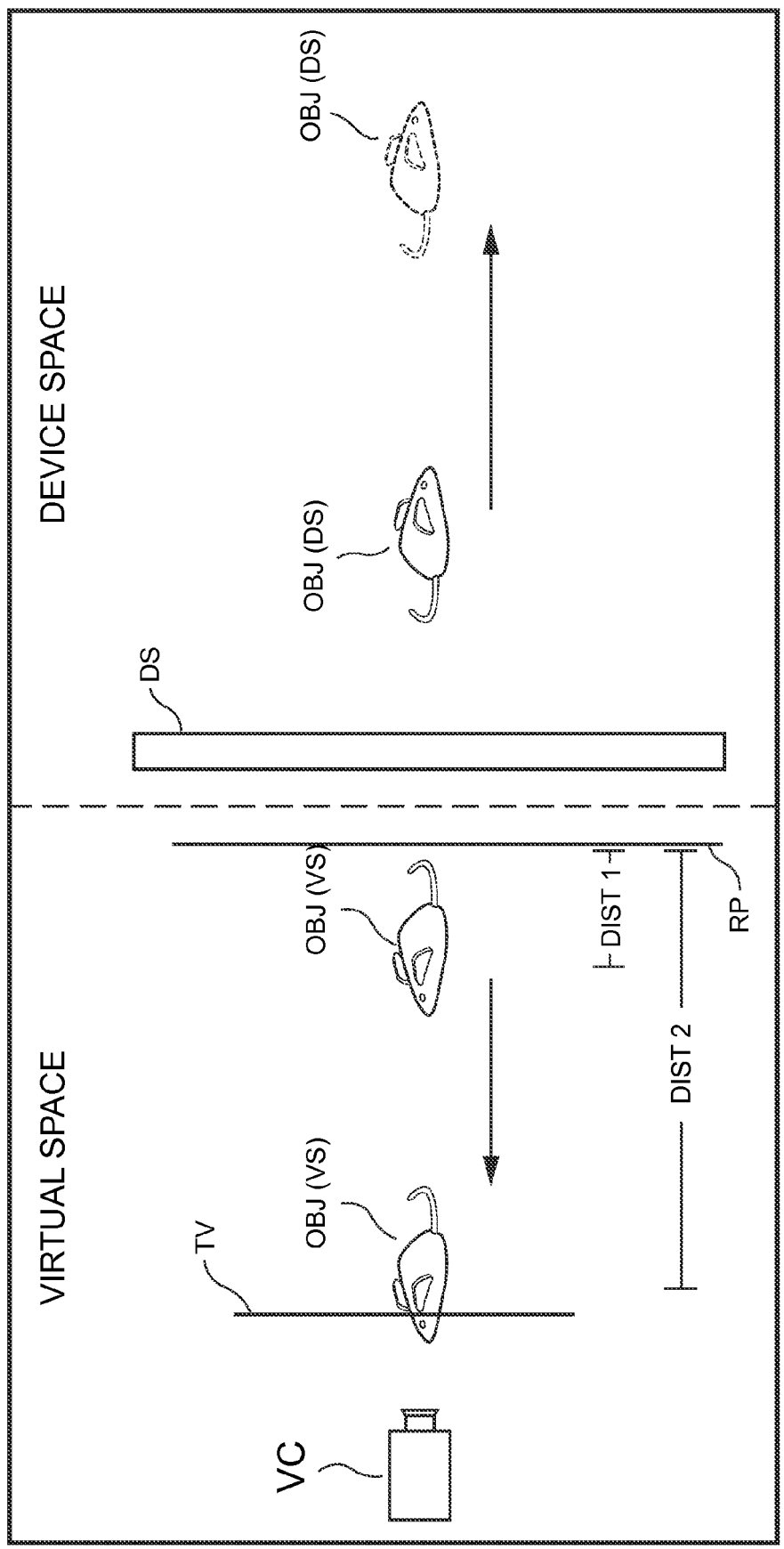

FIGS. 8A-C are diagrams showing certain example embodiments of the present system that further illustrate the flow of processes described in FIG. 5A-1 to FIG. 5A-3, respectively. FIG. 8A shows a diagram of an example embodiment where an object OBJ fades from display. On the left, the object OBJ movement is shown in the virtual space. In this example, the object OBJ is moving towards a virtual camera VC. As the object OBJ moves towards the virtual camera VC, the object OBJ will appear as though it is moving farther away from the display screen DS in the device space, as shown on the right. The object may also appear as though it is getting bigger on the display screen DS in the device space.

In FIG. 8A, the object's OBJ distance from the display screen DS is determined, and once the object OBJ reaches a threshold value TV, the object OBJ will begin fading from the display screen. So in the example shown in FIG. 8A, the object OBJ at distance DIST 1 is not close enough to the threshold value (i.e., the distance DIST 1 is not greater than threshold value TV) to begin fading the object OBJ. But at distance DIST 2, the object OBJ has reached the threshold value TV distance so that the object OBJ will begin fading from the display. In FIG. 8A, the distances DIST 1, DIST 2, and TV from the stereoscopic display screen DS are in the device space. In other words, conversion into the device space precedes distance comparison to the threshold value TV to determine whether to fade the object OBJ.

In FIG. 8B, the object OBJ moves in both the virtual space and the device space in the same manner as shown in FIG. 8A. That is, the object OBJ moves toward the virtual camera VC in the virtual space and perceived to move away from and/or become larger on the display screen DS in the device space. In the example shown in FIG. 8B, the object's OBJ distance from the virtual camera VC is measured. Once the object's OBJ distance has come within the threshold value TV, the object OBJ will begin fading from the display as shown on the right in the device space. So for example, the object OBJ at distance DIST 1 is too far from the virtual camera VC (i.e., the distance is not less than the threshold) to begin the fading process. But once the object reaches distance DIST 2 (i.e., once the distance between the virtual camera VC and the object OBJ is equal to or less than the threshold value TV), the object's OBJ distance comes within the threshold value TV. Compared to FIG. 8A, the distance can be a decreasing numerical value in the embodiment shown in FIG. 8B. That is, in FIG. 8A, the greater the distance, the more likely the object OBJ will come to exceeding the threshold value where in FIG. 8B, the smaller the distance, the more likely the object OBJ will come within the threshold value. As such, in the example shown in FIG. 8B, the object OBJ fades from the display screen DS in the device space, based on its distance from the virtual camera VC in the virtual space. Also, in the example shown in FIG. 8B, virtual distances are compared to determine fade out rather than distances in device space being compared as in the example shown in FIG. 8A.

In FIG. 8C, the object OBJ once again moves in the same manner as shown in FIGS. 8A and 8B. In the example shown in FIG. 8C, the object's OBJ distance is measured from a predefined reference plane RP in the virtual space. As the object moves away from the reference plane RP and towards exceeding the threshold value TV, the object OBJ will begin fading from the display in the device space. So in FIG. 8C, the object's OBJ distance DIST 1 is close to the reference plane RP and does not exceed the threshold value TV, and thus fading does not begin. When the object OBJ reaches distance DIST 2 the threshold value TV is reached and the object OBJ will begin fading from the display.

In an example embodiment, the distance of the object OBJ from the reference plane in the virtual space will correspond to the distance of the object OBJ from the display screen DS in the device space. So in the example shown in FIG. 8C, the object OBJ will fade from display in the device space based on its location in the virtual space. In comparison, in FIG. 8A, the object OBJ will fade based on its perceived visual distance from the display screen DS in the device space. In FIG. 8C however, the object's OBJ location and distance from the reference plane RP is known and measured in the virtual space rather than the device space and the object OBJ will fade based on its distance from the reference plane RP in the virtual space.

In a preferred embodiment, the display screen DS will be a stereoscopic display screen allowing for 3-D viewing of the on-screen objects. However, a non-stereoscopic display screen can also be used and the systems and processes above can be implemented in a similar manner. It should also be appreciated that the measurements and thresholds for determining when to fade the object can be combined. For example, the system can determine when to fade the object based on calculations in both the device space (see e.g., FIG. 8A) and the virtual space (see e.g., FIGS. 8B and 8C).

As another example, a fade out process can only begin when that object is located both at a greater virtual distance than a first threshold in FIG. 8C and a lesser virtual distance than a second threshold in FIG. 8B (i.e., the embodiments of FIGS. 8B and 8C can be combined to determine when to fade out an object).

While the system has been described above as using a single virtual camera, the same system can be implemented in a system using two or more virtual cameras. For example, the system can be implemented in a 3-D viewing system that uses at least two virtual cameras.

While the system has been described in connection with what is presently considered to be the most practical and preferred embodiment, it is to be understood that the system is not to be limited to the disclosed embodiment, but on the contrary, is intended to cover various modifications and equivalent arrangements included within the spirit and scope of the appended claims.

What is claimed is:

1. A method for controlling objects on a stereoscopic display implemented using an information processing apparatus having a processing system including at least one processor, the method comprising:

determining a location of an object in a three-dimensional virtual space;

determining a distance of the object from a virtual camera in the three-dimensional virtual space;

determining if the distance of the object from the virtual camera comes within a threshold value;

transforming, using the processing system, the three-dimensional virtual space into a display image displayable on the stereoscopic display; and transitioning an appearance of the object in the display image on the display if the distance comes within the threshold value.

2. The method of claim 1, wherein the appearance of the object transitions gradually over a preset period of time.

3. The method of claim 1, wherein the transitioning of the appearance of the object includes the object performing a fading using a blending technique.

4. The method of claim 1, wherein the closer the object comes to the virtual camera the closer the object comes within the threshold value.

5. The method of claim 1, wherein the threshold value is variable depending upon a type of the object.

6. The method of claim 1, wherein the threshold value is variable depending upon a state of gameplay involving the object.

7. The method of claim 1, further comprising:
determining a distance of the object from a reference plane in the three-dimensional virtual space;
determining if the distance of the object from the reference plane exceeds a threshold value; and
transitioning an appearance of the object in the display image on the display based on at least one of the distance of the object from the reference plane exceeding the threshold value and the distance of the object from the virtual camera coming within the threshold value.

8. A non-transitory computer readable storage medium having computer readable code embodied therein for executing an application program using at least one computer having at least one processor, the program causing the computer to perform functionality comprising:
determining a location of an object in a three-dimensional virtual space;
determining a distance of the object from a virtual camera in the three-dimensional virtual space;
determining if the distance of the object from the virtual camera is less than a threshold value;
transforming, using the processor, the three-dimensional virtual space into a display image displayable on a stereoscopic display; and
transitioning an appearance of the object in the display image on the display if the distance comes within the threshold value.

9. A user interface apparatus comprising:
a stereoscopic display configured to display objects; and
a processing system having at least one processor, the processing system configured to:
determine a location of an object in a three-dimensional virtual space;
determine a distance of the object from a virtual camera in the three-dimensional virtual space;
determine if the distance of the object from the virtual camera comes within a threshold value;
transform the three-dimensional virtual space into a display image displayable on the stereoscopic display; and
transition an appearance of the object in the display image on the display if the distance comes within the threshold value.

10. A user interface system, comprising:
a display device configured to display objects; and
a user interface apparatus having at least one processor and configured to:
determine a location of an object in a three-dimensional virtual space;
determine a distance of the object from a virtual camera in the three-dimensional virtual space;
determine if the distance of the object from the virtual camera comes within a threshold value;
transform the three-dimensional virtual space into a display image displayable on the display device; and
transition an appearance of the object in the display image on the display device if the distance comes within the threshold value.

11. A method for controlling objects on a stereoscopic display implemented using an information processing apparatus having a processing system including at least one processor, the method comprising:
determining a location of an object in a three-dimensional virtual space;
determining a distance of the object from a reference plane in the three-dimensional virtual space;
determining if the distance of the object from the reference plane exceeds a threshold value;
transforming, using the processing system, the three-dimensional virtual space into a display image displayable on the stereoscopic display; and
transitioning an appearance of the object in the display image on the display if the distance exceeds the threshold value.

12. The method of claim 11, wherein the appearance of the object transitions gradually over a preset period of time.

13. The method of claim 11, wherein the transitioning of the appearance of the object includes the object performing a fading using a blending technique.

14. The method of claim 11, further comprising:
determining a distance of the object from a virtual camera in the three-dimensional virtual space;
determining if the distance of the object from the virtual camera comes within a threshold value; and
transitioning an appearance of the object in the display image on the display based on at least one of the distance of the object from the reference plane exceeding the threshold value and the distance of the object from the virtual camera coming within the threshold value.

15. The method of claim 11, wherein the threshold value is variable depending upon a type of the object.

16. The method of claim 11, wherein the threshold value is variable depending upon a state of gameplay involving the object.

17. The method of claim 11, wherein the reference plane in the three-dimensional virtual space corresponds to a reference plane in a real device space and the appearance of the object transitions based upon a perceived visual distance of the object in the real device space using the measured distance of the object from the reference plane in the three-dimensional virtual space.

18. A non-transitory computer readable storage medium having computer readable code embodied therein for executing an application program using at least one computer having at least one processor, the program causing the computer to perform functionality comprising:
determining a location of an object in a three-dimensional virtual space;
determining a distance of the object from a reference plane in the three-dimensional virtual space;

determining if the distance of the object from the reference plane exceeds a threshold value;
transforming, using the processor, the three-dimensional virtual space into a display image displayable on a stereoscopic display; and
transitioning an appearance of the object in the display image on the display if the distance exceeds the threshold value.

19. A user interface apparatus comprising:
a stereoscopic display configured to display objects; and
a processing system having at least one processor, the processing system configured to:
   determine a location of an object in a three-dimensional virtual space;
   determine a distance of the object from a reference plane in the three-dimensional virtual space;
   determine if the distance of the object from the reference plane exceeds a threshold value;
   transform the three-dimensional virtual space into a display image displayable on the stereoscopic display; and
   transition an appearance of the object in the display image on the display if the distance exceeds the threshold value.

20. A user interface system, comprising:
a display device configured to display objects; and
a user interface apparatus having at least one processor and configured to:
   determine a location of an object in a three-dimensional virtual space;
   determine a distance of the object from a reference plane in the three-dimensional virtual space;
   determine if the distance of the object from the reference plane exceeds a threshold value;
   transform the three-dimensional virtual space into a display image displayable on the display device; and
   transition an appearance of the object in the display image on the display device if the distance exceeds the threshold value.

* * * * *